(12) United States Patent
Almudallal et al.

(10) Patent No.: US 11,133,713 B2
(45) Date of Patent: *Sep. 28, 2021

(54) WIRELESS ELECTRIC FIELD POWER TRANSFER SYSTEM AND TRANSMITTER, AND METHOD OF WIRELESSLY TRANSFERRING POWER

(71) Applicant: Solace Power Inc., Mount Pearl (CA)

(72) Inventors: Ahmad M. Almudallal, Mount Pearl (CA); Andrew Bartlett, Mount Pearl (CA); Samuel Robert Cove, Mount Pearl (CA)

(73) Assignee: SOLACE POWER INC., Mount Pearl (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,616

(22) Filed: Dec. 20, 2019

(65) Prior Publication Data

US 2020/0203998 A1 Jun. 25, 2020

Related U.S. Application Data

(60) Provisional application No. 62/783,242, filed on Dec. 21, 2018.

(51) Int. Cl.
*H02J 50/05* (2016.01)
*H02J 50/12* (2016.01)

(52) U.S. Cl.
CPC .............. *H02J 50/12* (2016.02); *H02J 50/05* (2016.02)

(58) Field of Classification Search
CPC .................................. H02J 50/05; H02J 50/12

USPC .......................................................... 307/104
See application file for complete search history.

(56) References Cited

U.S. PATENT DOCUMENTS

| | | | |
|---|---|---|---|
| 9,509,173 B2 | 11/2016 | Kim et al. | |
| 9,653,948 B2 | 5/2017 | Polu et al. | |
| 9,979,206 B2 | 5/2018 | Nyberg et al. | |
| 2013/0038402 A1 | 2/2013 | Karalis et al. | |
| 2014/0375251 A1* | 12/2014 | Sakai | H02M 7/537 320/107 |

(Continued)

OTHER PUBLICATIONS

Huang L, Hu AP, Swain AK, Su Y. "Z-impedance compensation for wireless power transfer based on electric field, IEEE Transactions on Power Electronics," Apr. 21, 2016; 31(11): pp. 7556-7563.

(Continued)

*Primary Examiner* — William Hernandez
(74) *Attorney, Agent, or Firm* — Harness, Dickey & Pierce, P.L.C.

(57) ABSTRACT

A transmit resonator is provided. The transmit resonator comprises: two inductors; a switching network electrically connected to the inductors; a plurality of capacitive electrodes electrically connected to the switching network; a detector communicatively connected to the capacitive electrodes; and a controller communicatively connected to the switching network and the detector. The detector is configured to detect impedance. The controller is configured to control the switching network to control which electrodes are connected to the inductors based on the detected impedance. The inductors and electrodes are configured to resonate to generate an electric field.

23 Claims, 18 Drawing Sheets

(56) References Cited

U.S. PATENT DOCUMENTS

| | | | |
|---|---|---|---|
| 2015/0349542 A1* | 12/2015 | Yamamoto | H02J 50/40 |
| | | | 307/104 |
| 2017/0022916 A1 | 1/2017 | Hirai et al. | |
| 2017/0117751 A1* | 4/2017 | Karnstedt | H02J 7/025 |
| 2019/0280529 A1* | 9/2019 | Kawanami | H02J 7/025 |
| 2020/0099254 A1 | 3/2020 | Bartlett et al. | |
| 2020/0203998 A1* | 6/2020 | Almudallal | H02J 50/12 |

OTHER PUBLICATIONS

Lu F, Zhang H, Mi C, A Review on the Recent Development of Capacitive Wireless Power Transfer Technology, Energies, Nov. 2017 10(11): p. 1752.

International Search Report and Written Opinion for PCT/CA2019/051860 dated Apr. 6, 2020.

* cited by examiner

WIRELESS ELECTRIC FIELD POWER TRANSFER SYSTEM AND TRANSMITTER, AND METHOD OF WIRELESSLY TRANSFERRING POWER

RELATED APPLICATION

This application claims the benefit of U.S. Provisional Application No. 62/783,242 filed on Dec. 21, 2018, the entire content of which is incorporated herein by reference.

FIELD

The subject application relates generally to wireless power transfer and in particular, to a wireless electric field power transfer system, and a transmitter and receiver therefor.

BACKGROUND

A variety of wireless power transfer systems are known. A typical wireless power transfer system includes a power source electrically connected to a wireless power transmitter, and a wireless power receiver electrically connected to a load. In magnetic induction systems, the transmitter has an induction coil that transfers electrical energy from the power source to an induction coil of the receiver. Power transfer occurs due to coupling of magnetic fields between the induction coils of the transmitter and receiver. The range of these magnetic induction systems is limited and the induction coils of the transmitter and receiver must be in optimal alignment for power transfer. There also exist resonant magnetic systems in which power is transferred due to coupling of magnetic fields between the induction coils of the transmitter and receiver. However, in resonant magnetic systems the induction coils are resonated using at least one capacitor. The range of power transfer in resonant magnetic systems is increased over that of magnetic induction systems and alignment issues are rectified. While electromagnetic energy may be produced in magnetic induction and resonant magnetic systems, the majority of power transfer occurs via the magnetic field. Little, if any, power is transferred via electric induction or resonant electric induction.

In electrical induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. Resonant electric systems have an increased range of power transfer compared to that of electric induction systems and alignment issues are rectified. While electromagnetic energy may be produced in electric induction and resonant electric systems, the majority of power transfer occurs via the electric field. Little, if any, power is transferred via magnetic induction or resonant magnetic induction.

Although wireless power transfer techniques are known, improvements are desired. It is therefore an object to provide a novel wireless electric field power transfer system, a transmitter and receiver therefor and a method of wirelessly transmitting power.

SUMMARY

It should be appreciated that this Summary is provided to introduce a selection of concepts in a simplified form that are further described below in the Detailed Description of Embodiments. This Summary is not intended to be used to limit the scope of the claimed subject matter.

Accordingly, in an aspect, there is provided a transmit resonator comprising: at least two inductors; a switching network electrically connected to the inductors; a plurality of capacitive electrodes electrically connected to the switching network; a detector communicatively connected to the controller, the detector configured to detect impedance; and a controller communicatively connected to the switching network and the detector, the controller configured to control the switching network to control which electrodes are connected to the inductors based on the detected impedance, wherein the inductors and electrodes are configured to resonate to generate an electric field.

In one or more embodiments, the detector comprises a first detector and a second detector.

In one or more embodiments, the first detector is configured to detect impedance presented to the electrodes.

In one or more embodiments, the detector comprises at least one circuit and a phase detector. In one or more embodiments, the circuit is configured to measure impedance by applying a voltage and detecting a current.

In one or more embodiments, the second detector is configured to detect impedance during wireless power transfer.

In one or more embodiments, the switching network is configured to electrically connect each electrode to both inductors.

In one or more embodiments, the transmit resonator has an equal number of inductors as capacitive electrodes.

In one or more embodiments, the capacitive electrodes are electrically connected to the switching network In one or more embodiments, the detector is electrically connected to the controller and/or the controller is electrically connected to the switching network.

In one or more embodiments, the inductors are variable inductors. In one or more embodiments, the controller is electrically connected to the variable inductors, and wherein the controller is configured to control the inductance of the variable inductors. In one or more embodiments, the capacitive electrodes are electrically connected to the switching network via the variable inductors.

In one or more embodiments, the inductors and electrodes are configured to resonate to generate the electric field to transfer power via electric field coupling.

According to another aspect there is provided a wireless power transfer system comprising any of the described transmit resonators.

According to another aspect there is provided a wireless power transfer system comprising: a transmitter comprising: a power source configured to generate a power signal; and a transmit resonator electrically connected to the power source, the transmit resonator comprising: at least two transmit inductors; a switching network electrically connected to the transmit inductors; a plurality of transmit capacitive electrodes electrically connected to the switching network; a detector communicatively connected to the controller, the detector configured to detect impedance; and a controller communicatively connected to the switching network and the detector, the controller configured to control the switching network to control which transmit capacitive electrodes are connected to the transmit inductors based on the detected impedance, wherein the transmit inductors and transmit capacitive electrodes are configured to resonate to generate an electric field; and a receiver comprising: a load; and a receiver resonator electrically connected to the load, the receive resonator comprising: at least two receive inductors; and at least two receive capacitive electrodes electrically connected to the receive inductors, wherein the receive inductors and receive capacitive electrodes are configured to resonate in the generated electric field and extract power via resonant electric field coupling.

In one or more embodiments, the transmitter further comprises an inverter electrically connected between the power supply and the transmit resonator.

In one or more embodiments, the receiver further comprises a rectifier electrically between the load and the receive resonator.

According to another aspect there is provided a method of wireless power transfer, the method comprising: detecting impedances at at least two capacitive electrodes electrically connected to a switching network; communicating the impedances at the capacitive electrodes to a controller communicatively connected to the switching network; determining, at the controller, a subset of capacitive electrodes to connect to at least two inductors based on the impedances at the capacitive electrodes, the inductors electrically connected to the switching network; connecting the subset of capacitive electrodes to the inductors; and resonating the inductors and the subset of capacitive electrodes to generate an electric field.

In one or more embodiments, connecting the subset of capacitive electrodes comprises sending a signal from the controller to the switching network to connect the subset of capacitive electrodes to the inductors.

In one or more embodiments, the method further comprises: detecting impedances at the inductors; sending the impedances at the inductors to the controller; determining, at the controller, if the impedances at the inductors are within a range of impedances; and sending a signal from the controller to the switching network to disconnect all capacitive electrodes from the inductors if the impedances at the inductors are not within the range of impedances.

In one or more embodiments, the range of impedances are impedances at which power can be transferred from the capacitive electrodes and inductors via resonant electric coupling.

In one or more embodiments, the method further comprises: resonating inductors and capacitive electrodes of a receiver at the resonant frequency; and extracting power from the generated electric field via resonant electric field coupling.

BRIEF DESCRIPTION OF THE DRAWINGS

Embodiments will now be described more fully with reference to the accompanying drawings, in which.

DETAILED DESCRIPTION OF EMBODIMENTS

Figure 1:
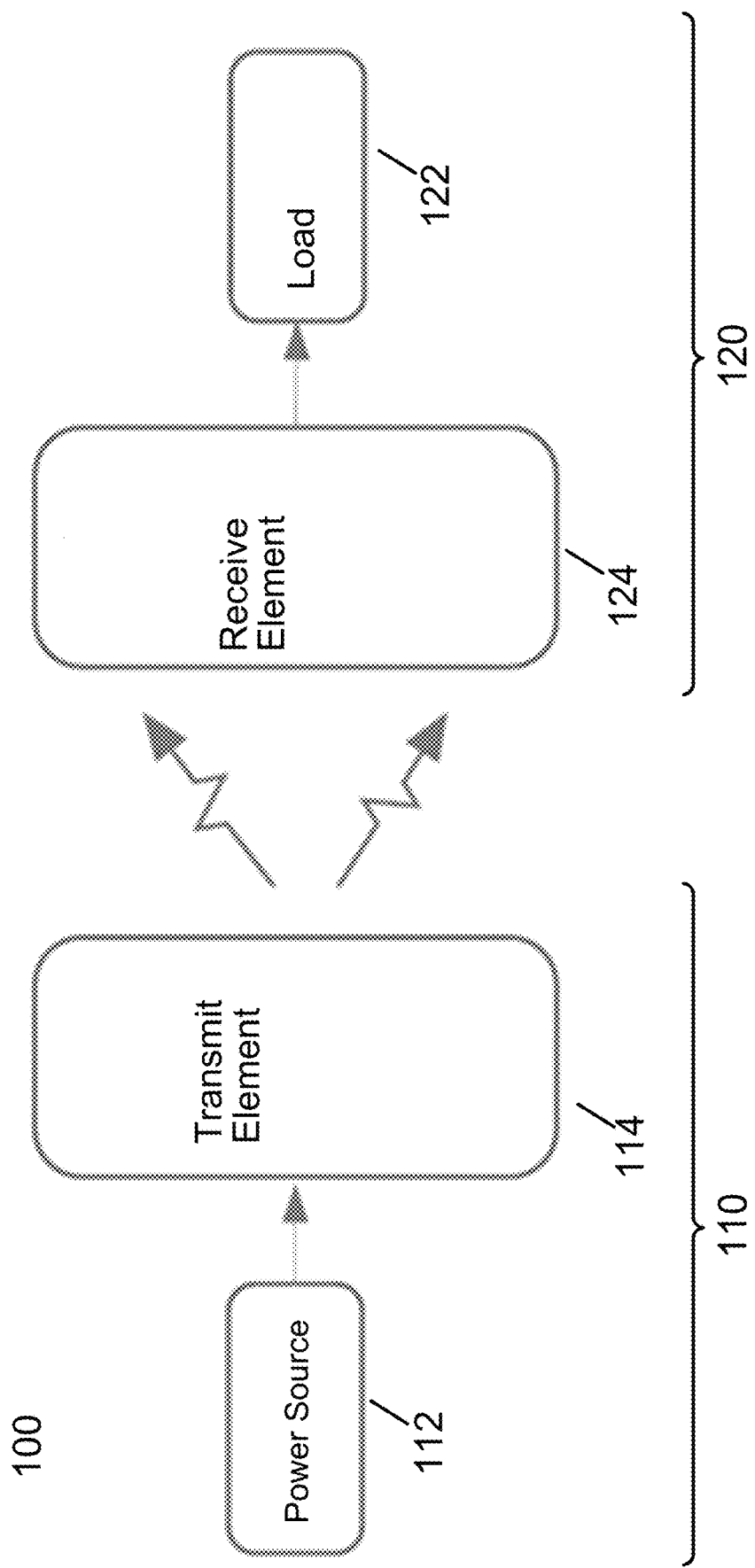
FIG. 1 is a block diagram of a wireless power transfer system.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property may further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

FIG. 1 shows a wireless power transfer system generally identified by reference numeral 100. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is then transferred from the transmit element 114 to the receive element 124 via resonant or non-resonant electric or magnetic field coupling. The power is then transferred from the receive element 124 to the load 122.

Figure 2:
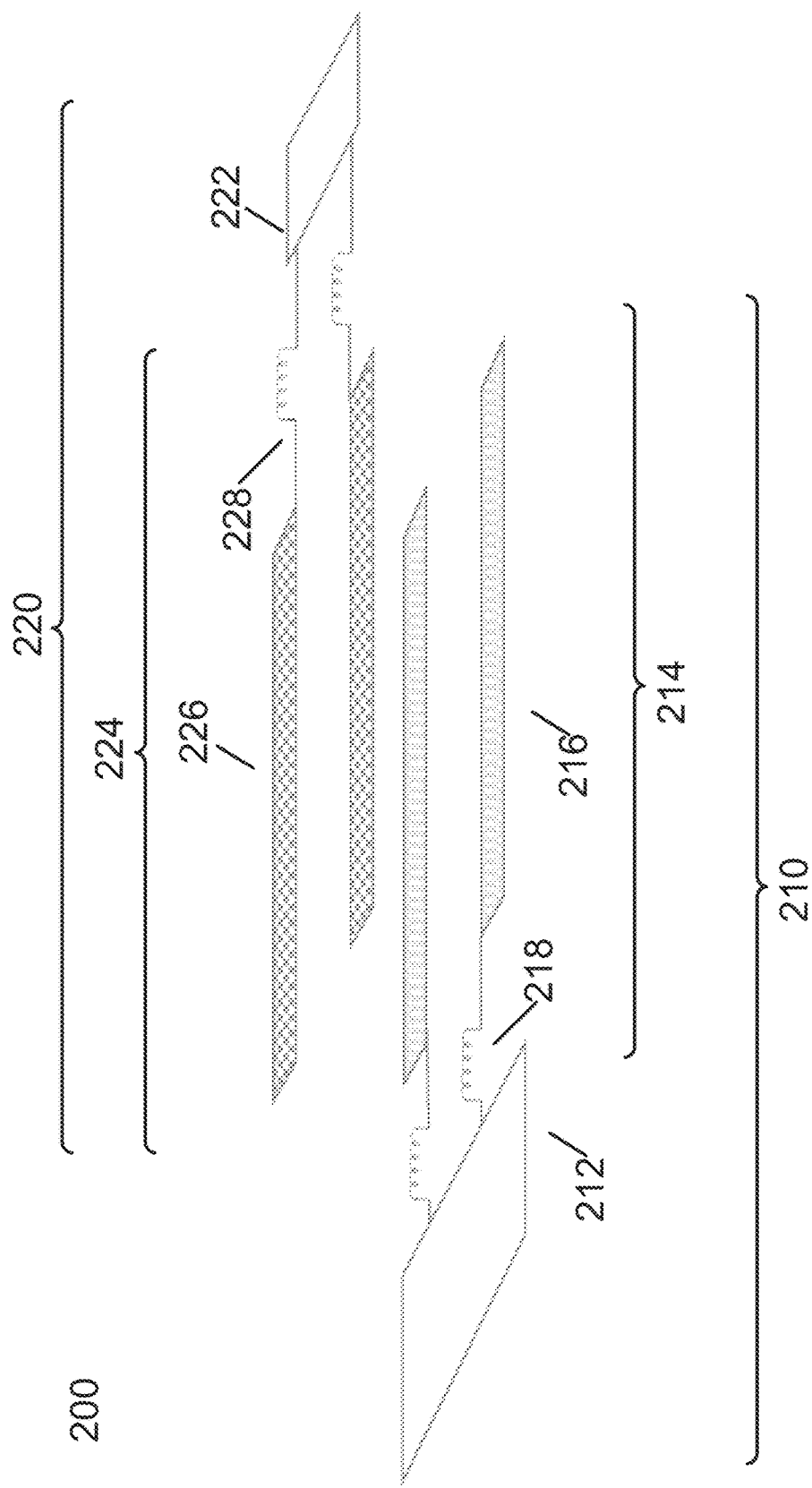
FIG. 2 is a schematic layout of a wireless resonant electric field power transfer system.

In one example embodiment, the wireless power transfer system may take the form of a resonant electric field wireless power transfer system. FIG. 2 shows a resonant electric field wireless power transfer system generally identified by reference numeral 200 such as that described in U.S. Pat. No. 9,653,948 to Polu et al. filed on Sep. 7, 2012, the relevant portions of which are incorporated herein by reference.

The resonant electric field wireless power transfer system 200 comprises a transmitter 210 comprising a power source 212 electrically connected to a transmit resonator 214. The transmit resonator 214 comprises a pair of laterally spaced, elongate transmit capacitive electrodes 216, each of which is electrically connected to the power source 212 via a high quality factor (Q) transmit inductor 218. The system 200 further comprises a receiver 220 comprising a receiver resonator 224 electrically connected to a load 222. The receive resonator 224 is tuned to the resonant frequency of the transmit resonator 214. The receive resonator 224 comprises a pair of laterally spaced, elongate receive capacitive electrodes 226, each of which is electrically connected to the load 222 via a high Q receive inductor 228.

In this embodiment, the inductors 218 and 228 are ferrite core inductors. One of skill in the art however will appreciate that other cores are possible.

In this embodiment, each transmit and receive capacitive electrode 216 and 226 comprises an elongate element formed of electrically conductive material. The transmit capacitive electrodes 216 are coplanar. The receive capacitive electrodes 226 are coplanar. In this embodiment, the transmit capacitive electrodes 216 and the receive capacitive electrodes 226 are in parallel planes. In this embodiment, the transmit capacitive electrodes 216 and the receive capacitive electrodes 226 are in the form of generally rectangular, planar plates.

While the transmit capacitive electrodes 216 and receive capacitive electrodes 226 have been described as laterally spaced, elongate electrodes, one of skill in the art will appreciate that other configurations are possible including, but not limited to, concentric, coplanar, circular, elliptical, disc, etc., electrodes. Other suitable electrode configurations are described in U.S. Pat. No. 9,979,206 to Nyberg et al. filed on Sep. 4, 2015, the relevant portions of which are incorporated herein by reference.

While the inductors 218 and 228 are shown as being connected in series to the power source 212 and the load 222, respectively, in FIG. 2, one of skill in the art will appreciate that the inductors 218 and 228 may be connected to the power source 212 and the load 222, respectively, in parallel.

During operation, power is transferred from the power source 212 to the transmit capacitive electrodes 216 via the high Q transmit inductors 218. In particular, the power signal from the power source 212 that is transmitted to the transmit capacitive electrodes 216 via the high Q transmit inductors 218 excites the transmit resonator 214 causing the transmit resonator 214 to generate an electric field. When the receiver 220, which is tuned to the same resonant frequency as the transmitter 210, is placed within the resonant electric field, the receive resonator 224 extracts power from the transmit resonator 214 via resonant electric field coupling. The extracted power is then transferred from the receive resonator 224 to the load 222. As the power transfer is highly resonant, the transmit and receive capacitive electrodes 216 and 226, respectively, need not be as close together or as well aligned as is the case with the non-resonant electric field power transfer system. While the transmit resonator 214 may generate a magnetic field, little, if any, power is transmitted via magnetic field coupling.

When the transmit and receive capacitive electrodes 216 and 226, respectively, are generally aligned power is transferred as previously described. When the capacitive electrodes 216 and 226 are not generally aligned, power transfer may decrease or may not be possible at all.

Figure 3:
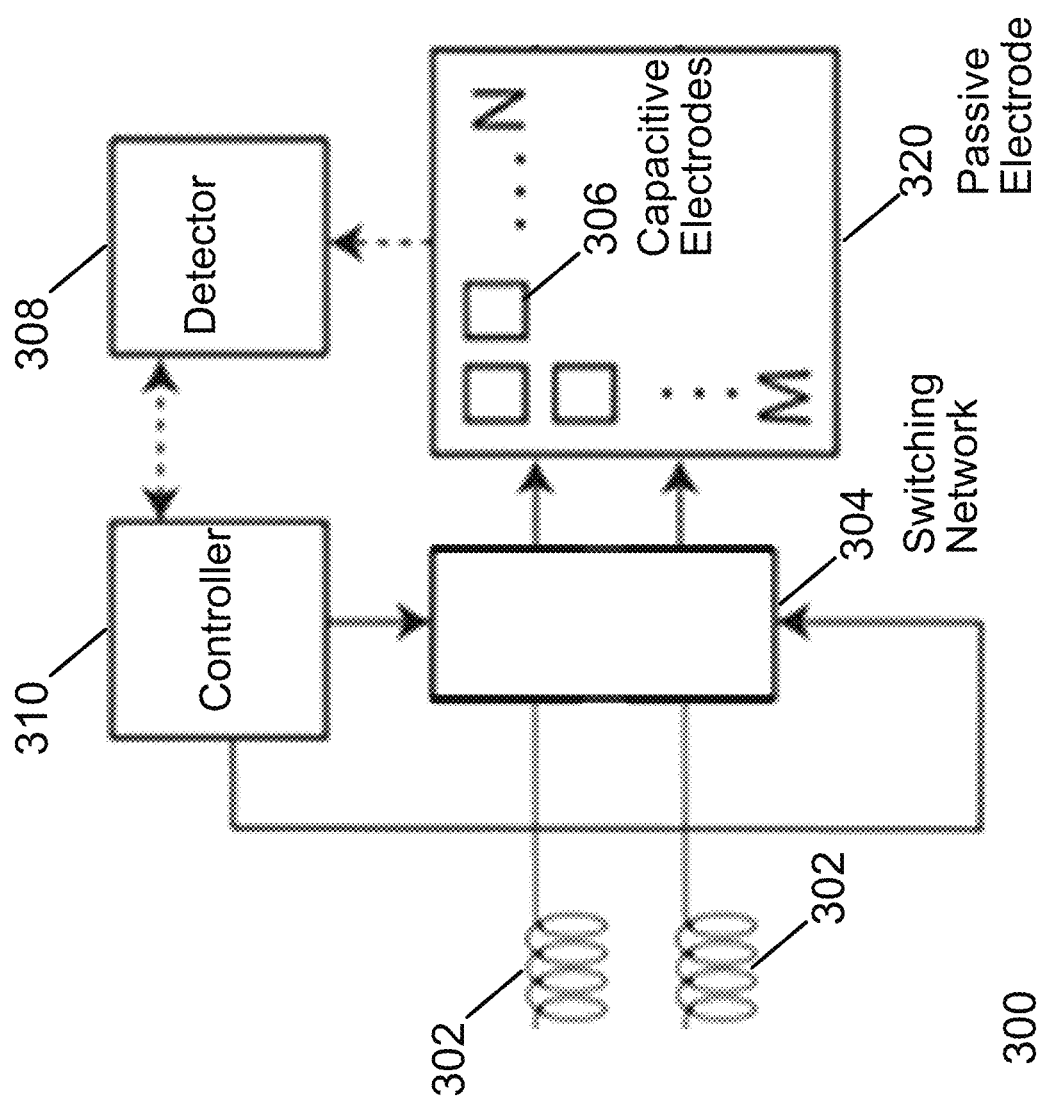
FIG. 3 is a schematic layout of a transmit resonator in accordance with an aspect of the disclosure.

To provide greater positional freedom of the resonators, a transmit resonator in accordance with an aspect of the disclosure is provided. FIG. 3 shows a transmit resonator generally identified by reference numeral 300. The transmit resonator 300 is configured to generate an electric field to transfer power to one or more receive resonators as will be described. The transmit resonator 300 comprises two inductors 302, a switching network 304, capacitive electrodes 306, a detector 308 and a controller 310.

The inductors 302 are configured to resonate with the capacitive electrodes 306 at a resonant frequency to generate an electric field as will be described. The inductors 302 are electrically connected to the switching network 304. In this embodiment, the inductors 302 are ferrite core inductors. The inductors 302 are static inductors. One of skill in the art however will appreciate that other cores are possible. Furthermore, one of skill in the art will appreciate that more than two inductors 302 or fewer than two inductors 302 may be used.

The capacitive electrodes 306 are comprised of N×M capacitive electrodes. The capacitive electrodes 306 are arranged in a grid pattern, where N is the number of columns in the grid and M is the number of rows in the grid. Each capacitive electrode 306 is electrically connected to the switching network 304. The capacitive electrodes 306 are coplanar. The capacitive electrodes 306 are coplanar in the x-y plane. In this embodiment, each capacitive electrode 306 is a planar square plate electrode with identical dimensions.

The switching network 304 is configured to control which electrodes 306 resonate with the inductors 302 to generate an electric field. The switching network 304 is electrically connected to the inductors 302 and the controller 310. The switching network 304 electrically connects both of the inductors 302 to each of the capacitive electrodes 306. In this embodiment, the switching network 306 comprises multiple interconnected switches. In this embodiment, the switching network 304 comprises two inputs, one input for each inductor 302 and N×M×2 outputs. Each output is electrically connected to a single capacitive electrode 306. Each capacitive electrode 306 is electrically connected to two outputs of the switching network 304. The switching network 304 is configured to control the connection of the capacitive electrodes 306 to the inductors 302. At any given time, a capacitive electrode 306 may be connected, via the switching network 304, to both inductors 302, a single inductor 302 or no inductors 302. When a capacitive electrode 306 is not connected to any of the inductors 302, the capacitive electrode 306 may become electrically floating, or grounded, depending on the requirements of the transmit resonator 300.

The detector is configured to detect impedance. The detector is electrically connected to the capacitive electrodes 306. The detector is communicatively connected to the controller 310. In this embodiment, the detector comprises a first detector 308 configured to detect impedance presented to the electrodes 306. The first detector 308 comprises at least one circuit. In this embodiment, the first detector 308 further comprises a phase detector. The circuit comprises electrical components configured to detect impedance by applying a voltage and detecting a current. The phase detector is configured to detect a phase. The first detector 308 utilizes the detected current and the detected phase to determine the impedance presented to the electrodes 306. The first detector 308 determines the impedance presented at each electrode 306.

As previously stated, the detector is communicatively connected to the controller 310. The detected impedances are communicated to the controller 310. In this embodiment, the detector is electrically connected to the controller 310. Specifically, in this embodiment, the first detector 308 communicates all of the detected impedances to the controller 310. In this embodiment, the first detector 308 is electrically connected to the controller 310. In this embodiment, the detected impedances are communicated to the controller 310 through the wired connection between the controller 310 and first detector 308.

The controller 310 is configured to control the switching network 304 to determine which electrodes 306 are connected to which inductors 302. The controller 310 is communicatively connected to the switching network 304 and the first detector 308. In this embodiment, the controller 310 is electrically connected to the switching network 304 via a wired connection. The controller 310 is configured to send a control signal to the switching network 304 to control which electrodes 306 are connected to which inductors 302 based on the impedances from the first detector 308. While the controller 310 and switching network 304 have been described as separate and unique elements, one of skill in the art will appreciate that the controller 310 and switching network 304 may be incorporated into a single element.

In this embodiment, the controller 310 is a microcontroller. While the controller 310 has been described as a microcontroller, one of skill in the art will appreciate that other configurations are possible. In another embodiment, the controller 310 comprises one or more of software, hardware, a digital logic controller (DLC) and microprocessor.

One of skill in the art will appreciate that other configurations are possible. In another embodiment, the detected impedances are sent to the controller 310 via wireless communication. The controller 310 and first detector 308 are not electrically connected via wired connection. Furthermore, in another embodiment, the controller 310 is configured to send a control signal to the switching network 304 via wireless communication. The controller 310 is not electrically connected to the switching network 304 via a wired connection. Exemplary wireless communication schemes include WiFi™ and Bluetooth™.

In this embodiment, the transmit resonator 300 further comprises a passive electrode 320 as described in U.S. patent application Ser. No. 16/138,344 filed on Sep. 21, 2018, the relevant portions of which are incorporated herein by reference. The passive electrode 320 encompasses the electrodes 306 to at least partially eliminate environmental influences affecting the electrodes 306. The passive electrode 320 is adjacent the electrodes 306. In this embodiment, the passive electrode 320 and the electrodes 306 have parallel planes. The passive electrode 320 comprises an elongate element. The elongate element is formed of electrically conductive material. The elongate element is in the form of a generally rectangular, planar plate.

In operation, the first detector 308 detects impedances presented at the capacitive electrodes 306. Specifically, the first detector 308 detects the impedance presented at each capacitive electrode 306 consecutively (electrode 306 by electrode 306) or at all the electrodes 306 at once. The first detector 308 sends the detected impedances to the controller 310. When at least one receive resonator is presented to two or more electrodes 306 (a subset of the capacitive electrodes 306 or all the capacitive electrodes 306) and the detected impedances are greater than a threshold impedance. The threshold impedance is the lowest value of a range of impedances that allows the transmit resonator 300 to resonate at a resonant frequency. In this embodiment, the resonant frequency is 13.56 MHz. The controller 310 applies logic to determine which of the electrodes 306 have been presented with the impedances.

One of ordinary skill in the art will recognize that logic may include the use of an algorithm, such as but not limited to, a binary search, to be used to find which transmit capacitive electrodes 306 should be connected to the transmit inductors 302 upon placing a receiver into the system. In another embodiment, depending on the known constraints of a given wireless power transfer system, more information regarding the possible sizes and shapes of the receive resonators may result in logic involving increasingly complex and time-efficient algorithms to be possible and available for use within the system. In another embodiment, logic may include the implementation of a genetic algorithm in combination with a neural network to assist the system in quickly finding receivers. One of ordinary skill in the art will recognize that other algorithms are possible.

The controller 310 then sends a signal to the switching network 304 to connect the two or more electrodes 306 presented with the receive resonator to the inductors 302 and disconnect all other electrodes 306 from the inductors 302. The two or more electrodes 306 and the inductors 302 resonate at a resonant frequency to generate an electric field. The receive resonator, which is tuned to the same resonant frequency, extracts power from the electric field via resonant electric field coupling. While the transmit resonator 300 may generate electromagnetic energy, the majority of power transfer occurs via the electric field. Little, if any, power is transferred via magnetic induction or resonant magnetic induction.

Figure 4:
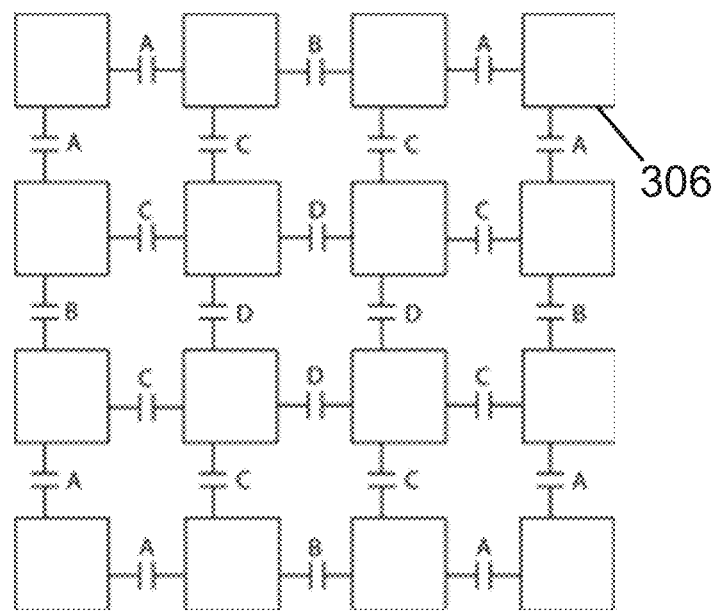
FIG. 4 is a schematic representation of capacitive electrodes of the transmit resonator of FIG. 3.
Figure 5:
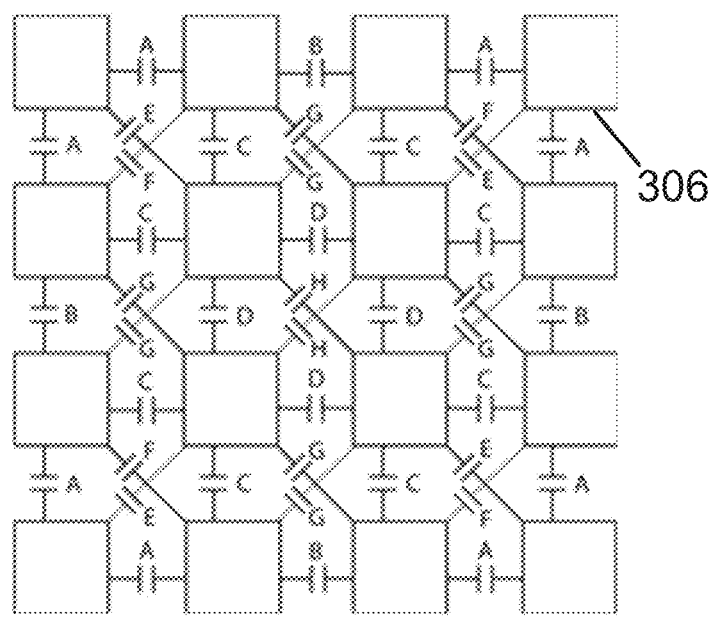
FIG. 5 is another schematic representation of capacitive electrodes of the transmit resonator of FIG. 3.

As the capacitive electrodes 306 have identical dimensions the capacitance between capacitive electrodes 306 has certain repeated values. FIGS. 4 and 5 show schematic representation of the capacitive electrodes 306 in a grid pattern, where N (the number of columns in the grid) is 4 and M (the number of rows in the grid) is 4. The capacitances between distinct pairs of capacitance electrodes 306 are shown in FIGS. 4 and 5. FIG. 4 shows four distinct capacitance values, A, B, C and D, between adjacent capacitance electrodes 306. FIG. 5 shows four distinct capacitance values, E, F, G and H, between diagonal capacitance electrodes 306. Capacitance values between the capacitive electrodes 306 and the passive electrode 320 is not shown.

Figure 6:
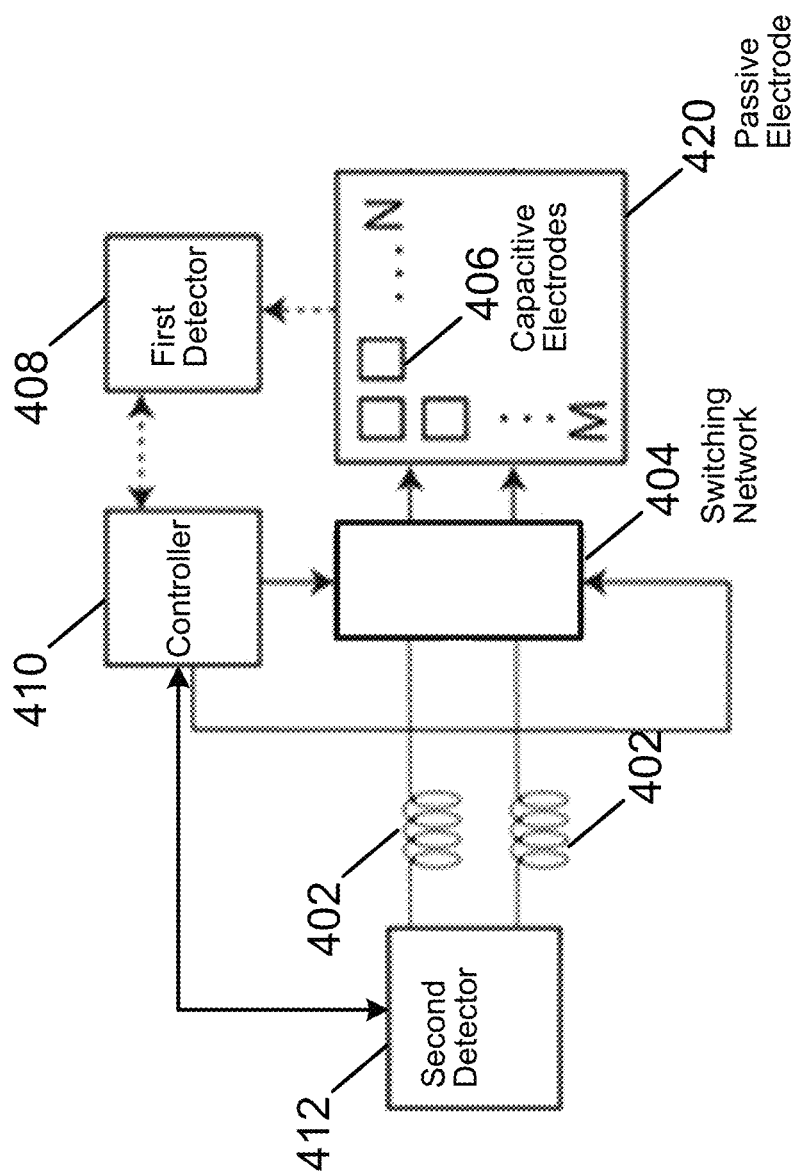
FIG. 6 is a schematic layout of another embodiment of a transmit resonator in accordance with an aspect of the disclosure.

While a particular transmit resonator 300 has been described, one of skill in the art will appreciate that other configurations are possible. FIG. 6 shows another embodiment of a transmit resonator generally identified by reference numeral 400. The transmit resonator 400 is configured to generate an electric field to transfer power to one or more receive resonators as will be described. The transmit resonator 400 comprises two inductors 402, a switching network 404, capacitive electrodes 406, a detector and a controller 410. In this embodiment, the transmit resonator 400 further comprises a passive electrode 420 as described in U.S. patent application Ser. No. 16/138,344 filed on Sep. 21, 2018, the relevant portions of which are incorporated herein by reference. The inductors 402, switching network 404, capacitive electrodes 406, controller 410 and passive electrode 420 are identical to the inductors 302, switching network 304, capacitive electrodes 306, controller 310 and passive electrode 320, respectively, previously described unless otherwise stated.

The detector is configured to detect impedance. In this embodiment, the detector comprises a first detector 408 and a second detector 412. The first detector 408 is configured to detect impedances presented to the electrodes 406. The first detector 408 is electrically connected to the capacitive electrodes 406. The first detector 408 is communicatively connected to the controller 410.

The first detector 408 comprises at least one circuit. In this embodiment, the first detector 408 further comprises a phase detector. The circuit comprises electrical components configured to detect impedance by applying a voltage and detecting a current. The phase detector is configured to detect a phase. The first detector 408 utilizes the detected current and the detected phase to determine the impedance presented to the electrodes 406. The first detector 408 determines the impedance presented at each electrode 406.

As previously stated, the first detector 408 is communicatively connected to the controller 410. The detected impedances are communicated to the controller 410. In this embodiment, the first detector 408 is electrically connected to the controller 410. The detected impedances are communicated to the controller 410 through the wired connection between the controller 410 and first detector 408.

The second detector 412 is configured to detect impedances at the inductors 402. The second detector 412 is electrically connected to the inductors 402. The second detector 412 is communicatively connected to the controller 410. The second detector 412 comprises at least one circuit. In this embodiment, the second detector 412 further comprises a phase detector. The circuit comprises electrical components configured to detect impedance by applying a voltage and detecting a current. The phase detector is configured to detect a phase. The second detector 412 utilizes the detected current and the detected phase to determine the impedances at the inductors 402.

As previously stated, the second detector 412 is communicatively connected to the controller 410. The detected impedances at the inductors 402 are communicated to the controller 410. In this embodiment, the second detector 412 is electrically connected to the controller 410. The detected impedances at the inductors 402 are communicated to the controller 410 through the wired connection between the controller 410 and second detector 412.

In this embodiment, the controller 410 is a microcontroller. While the controller 410 has been described as a microcontroller, one of skill in the art will appreciate that other configurations are possible. In another embodiment, the controller 410 comprises one or more of software, hardware, a digital logic controller (DLC) and microprocessor.

One of skill in the art will appreciate that other configurations are possible. In another embodiment, the detected impedances are sent to the controller 410 via wireless communication. The controller 410 and the first detector 408 are not electrically connected via wired connection. The controller 410 and the second detector 412 are not electrically connected via wired connection. Furthermore, in another embodiment, the controller 410 is configured to communicate a control signal to the switching network 404 via wireless communication. The controller 410 is not electrically connected to the switching network 404 via a wired connection. Exemplary wireless communication schemes include WiFi™ and Bluetooth™.

In operation, the first detector 408 detects impedances presented at the capacitive electrodes 406. When at least one receive resonator is presented to two or more capacitive electrodes 406 (a subset of the capacitive electrodes 406 or all the capacitive electrodes 406) and the detected impedances are greater than a threshold impedance, the first detector 408 sends the detected impedances to the controller 410. The threshold impedance is the lowest value of a range of impedances that allows the transmit resonator 400 to resonate at a resonant frequency. In this embodiment, the resonant frequency is 13.56 MHz. The second detector 412 detects impedances at the inductors 402. The second detector 412 sends the detected impedances at the inductors 402 to the controller 410. The controller 410 applies logic to determine which of the electrodes 406 have been presented with the impedances.

One of ordinary skill in the art will recognize that logic may include the use of an algorithm, such as but not limited to, a binary search, to be used to find which transmit capacitive electrodes 306 should be connected to the transmit inductors 302 upon placing a receiver into the system. In another embodiment, depending on the known constraints of a given wireless power transfer system, more information regarding the possible sizes and shapes of the receive resonators may result in logic involving increasingly complex and time-efficient algorithms to be possible and available for use within the system. In another embodiment, logic may include the implementation of a genetic algorithm in combination with a neural network to assist the system in quickly finding receivers. One of ordinary skill in the art will recognize that other algorithms are possible.

The controller 410 then sends a signal to the switching network 404 to connect the two or more electrodes 406 presented with the receive resonator to the inductors 402 and disconnect all other electrodes 406 from the inductors 402. The controller 410 compares the detected impedances presented at the capacitive electrodes 406 from the first detector 408 with the detected impedances at the inductors 402 from the second detector 412 to ensure the inductors 402 have impedances within the range of impedances that allows the transmit resonator 400 to resonate at a resonant frequency. If the inductors 402 have impedances within the range of impedances, the controller 410 takes no further action. If the inductors 402 have impedances that are not within the range of impedances, the controller 410 disconnects all capacitive electrodes 406 from the inductors 402 via a command to the switching network 404. This ensures the components of the transmit resonator 400 are not damaged.

When the two or more electrodes 406 are connected to the inductors 402 via the switching network 404, the two or more electrodes 406 resonate with the inductors 402 at a resonant frequency to generate an electric field. The receive resonator, which is tuned to the same resonant frequency, extracts power from the electric field via resonant electric field coupling. While the transmit resonator 400 may generate electromagnetic energy, the majority of power transfer occurs via the electric field. Little, if any, power is transferred via magnetic induction or resonant magnetic induction.

Figure 7:
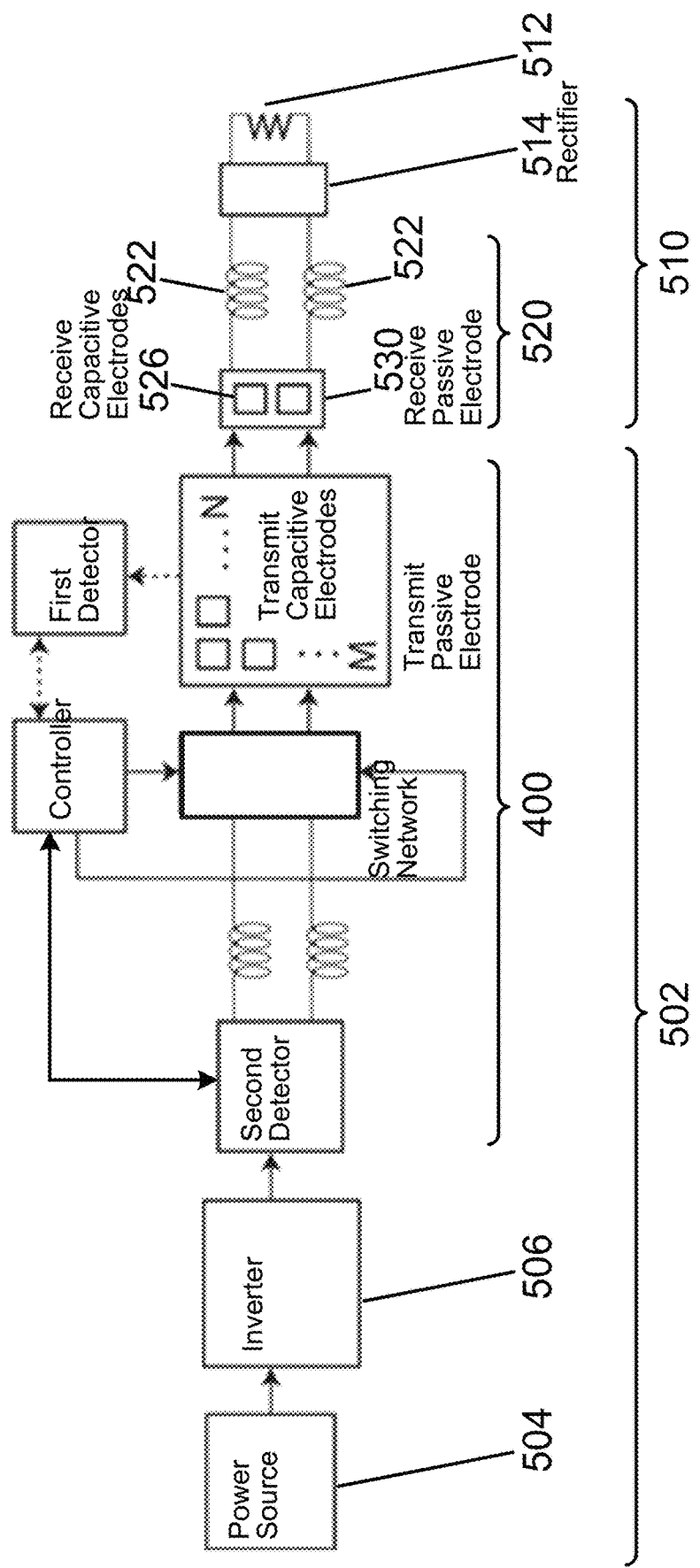
FIG. 7 is a schematic layout of a wireless power transfer system comprising the transmit resonator of FIG. 6.

The transmit resonator 300 and 400 may be incorporated into a wireless power transfer system. FIG. 7 shows such a wireless power transfer system in accordance with an aspect of the disclosure generally identified by reference numeral 500. The system 500 comprises a transmitter 502 and a receiver 510.

The transmitter 502 comprises a power source 504, an inverter 506 and the transmit resonator 400. The power source 504 is configured to supply power to the inverter 506. The power source 504 is electrically connected to the inverter 506. The power source 504 supplies direct current (DC) power to the inverter 506. The inverter 506 is configured to change the DC power from the power source 504 to alternating current (AC) power. The inverter 506 is electrically connected to the power source 504 and the second detector 412 of the transmit resonator 400. In this embodiment, the inverter 506 comprises an impedance matching circuit. The impedance matching circuit is configured to match the input impedance of the transmitter 502 to the output impedance of the transmitter 502.

The receiver 510 comprises a load 512, a rectifier 514 and a receive resonator 520. The load 512 comprises a device that requires power. For example, the load 512 comprises a battery. The load 512 is electrically connected to the rectifier 514. The rectifier 514 is configured to convert the AC power from the receive resonator 520 to DC power. The rectifier 514 is electrically connected to the load 512 and the receive resonator 520.

The receive resonator 520 is configured to extract power from the electric field generated by the transmit resonator 400 via resonant electric field coupling. The receive resonator 520 comprises two receive inductors 522 and two receive capacitive electrodes 526. In this embodiment, the receive resonator further comprises a receive passive electrode 530.

The receive inductors 522 are configured to resonate with the receive capacitive electrodes 526 to generate an electric field that has the same resonant frequency as the transmit resonator 400. Each receive inductor 522 is connected to a single receive capacitive electrode 526. In this embodiment, the receive inductors 522 are ferrite core inductors. The receive inductors 522 are static inductors. One of skill in the art however will appreciate that other cores are possible.

The receive capacitive electrodes 526 are coplanar. In this embodiment, each receive capacitive electrode 526 is a planar square plate electrode with identical dimensions. The receive capacitive electrodes 526 are aligned such that the receive capacitive electrodes 526 may overlap and be aligned with two capacitive electrodes 406 of the transmit resonator 400.

The receive passive electrode 530 is as described in U.S. patent application Ser. No. 16/138,344 filed on Sep. 21, 2018, the relevant portions of which are incorporated herein by reference. The receive passive electrode 530 encompasses the receive capacitive electrodes 526 to at least partially eliminate environmental influences affecting the receive capacitive electrodes 526. The receive passive electrode 530 is adjacent the receive capacitive electrodes 526. The receive passive electrode 530 and the receive capacitive electrodes 526 have parallel planes. The receive passive electrode 530 comprises an elongate element. The elongate element is formed of electrically conductive material. The elongate element is in the form of a generally rectangular, planar plate with opposed major surfaces.

In operation, DC power is transferred from the power source 504 to the inverter 506. The inverter 506 converts the DC power to AC power that is transferred to the transmit resonator 400. The first detector 408 detects impedances presented at the capacitive electrodes 406. When the receive capacitive electrodes 526 of the receive resonator 520 are at least partially aligned with two of the capacitive electrodes 406 (a subset of the capacitive electrodes 406) of the transmit resonator 400 and the detected impedances are greater than a threshold impedance, the first detector 408 sends the detected impedances to the controller 410. The threshold impedance is the lowest value of a range of impedances that allows the transmit resonator 400 to resonate at a resonant frequency. In this embodiment, the resonant frequency is 13.56 MHz. The second detector 412 detects impedances at the inductors 402. The second detector 412 sends the detected impedances at the inductors 402 to the controller 410. The controller 410 applies logic to determine which of the electrodes 406 have been presented with the impedances.

One of ordinary skill in the art will recognize that logic may include the use of an algorithm, such as but not limited to, a binary search, to be used to find which transmit capacitive electrodes 306 should be connected to the transmit inductors 302 upon placing a receiver into the system. In another embodiment, depending on the known constraints of a given wireless power transfer system, more information regarding the possible sizes and shapes of the receive resonators may result in logic involving increasingly complex and time-efficient algorithms to be possible and available for use within the system. In another embodiment, logic may include the implementation of a genetic algorithm in combination with a neural network to assist the system in quickly finding receivers. One of ordinary skill in the art will recognize that other algorithms are possible.

The controller 410 then sends a signal to the switching network 404 to connect the two or more electrodes 406 presented with the receive capacitive electrodes 526 to the inductors 402 and disconnect all other electrodes 406 from the inductors 402. The controller 410 compares the detected impedances presented at the capacitive electrodes 406 from the first detector 408 with the detected impedances at the inductors 402 from the second detector 412 to ensure the inductors 402 have impedances within the range of impedances that allows the transmit resonator 400 to resonate at a resonant frequency. If the inductors 402 have impedances within the range of impedances, the controller 410 takes no further action.

The AC power from the inverter 506 excites the two electrodes 406 and the inductors 402 causing the two electrodes 406 and the inductors 402 to resonate at a resonant frequency, and generate an electric field. The receive resonator 526, which is tuned to the same resonant frequency, extracts power from the electric field via resonant electric field coupling. While the transmit resonator 400 may generate electromagnetic energy, the majority of power transfer occurs via the electric field. Little, if any, power is transferred via magnetic induction or resonant magnetic induction. The power received at the receive resonator 520 is converted from AC power to DC power by the rectifier 514 applied to the load 512.

If the impedances detected at the inductors 402 are not within the range of impedances, the controller 410 disconnects all capacitive electrodes 406 from the inductors 402 via a signal sent to the switching network 404. This ensures the components of the transmit resonator 400 are not damaged.

When the receive capacitive electrodes 526 of the receive resonator 520 are no longer sufficiently aligned with at least two of the capacitive electrodes 406 of the transmit resonator 400, the first detector 408 detects that impedances presented at the respective electrodes 406 of the transmit resonator 400 are outside the range of impedances that allows the transmit resonator 400 to resonate at a resonant frequency. The first detector 408 sends the detected impedances to the controller 410. The controller 410 applies logic and determines that the receive capacitive electrodes 526 are no longer sufficiently aligned.

One of ordinary skill in the art will recognize that logic may include the use of an algorithm, such as but not limited to, a binary search, to be used to find which transmit capacitive electrodes 306 should be connected to the transmit inductors 302 upon placing a receiver into the system. In another embodiment, depending on the known constraints of a given wireless power transfer system, more information regarding the possible sizes and shapes of the receive resonators may result in logic involving increasingly complex and time-efficient algorithms to be possible and available for use within the system. In another embodiment, logic may include the implementation of a genetic algorithm in combination with a neural network to assist the system in quickly finding receivers. One of ordinary skill in the art will recognize that other algorithms are possible.

The controller 410 determines that none of the capacitive electrodes 406 of the transmit resonator 400 should be connected to the inductors 402. The controller 410 then sends a signal to the switching network 404 to disconnect all capacitive electrodes 406 from the inductors 402 such that no power is transferred from the transmit resonator 400.

When the receive capacitive electrodes 526 move such that they are aligned with two different capacitive electrodes 406 of the transmit resonator 400, the first detector 408 detects that impedances presented at the previously aligned two capacitive electrodes 406 have fallen below the threshold impedance and that the impedance presented at the different two capacitive electrodes 406 are greater than the threshold impedance. The first detector 408 sends all detected impedances to the controller 410. The controller 410 then sends a signal to disconnect the previously aligned two capacitive electrodes 406 from the inductors 402 and connect the different two capacitive electrodes 406 to the inductors 402. The AC power from the inverter 506 excites the different two electrodes 406 and the inductors 402 causing the different two electrodes 406 and the inductors 402 to resonate at a resonant frequency, and generate an electric field. The receive resonator 526, which is tuned to the same resonant frequency, extracts power from the electric field via resonant electric field coupling. While the transmit resonator 400 may generate electromagnetic energy, the majority of power transfer occurs via the electric field. Little, if any, power is transferred via magnetic induction or resonant magnetic induction. The power received at the receive resonator 520 is converted from AC power to DC power by the rectifier 514 applied to the load 512.

As will be appreciated, the wireless power transfer system 500 described allows for the receiver resonator 520 to move about the grid of capacitive electrodes 406 of the transmit resonator 400 and still maintain the resonant electric field coupling required for power transfer from the transmitter 502 to the receiver 510.

While operation of the wireless power transfer system 500 has been described when the receive capacitive electrodes 526 overlap and are aligned with the capacitive electrodes 406 of the transmit resonator 400, wireless power transfer may still occur when the receive capacitive electrodes 526 are not fully overlapping and/or aligned with the capacitive electrodes 406 of the transmit resonator 400.

Figure 8:
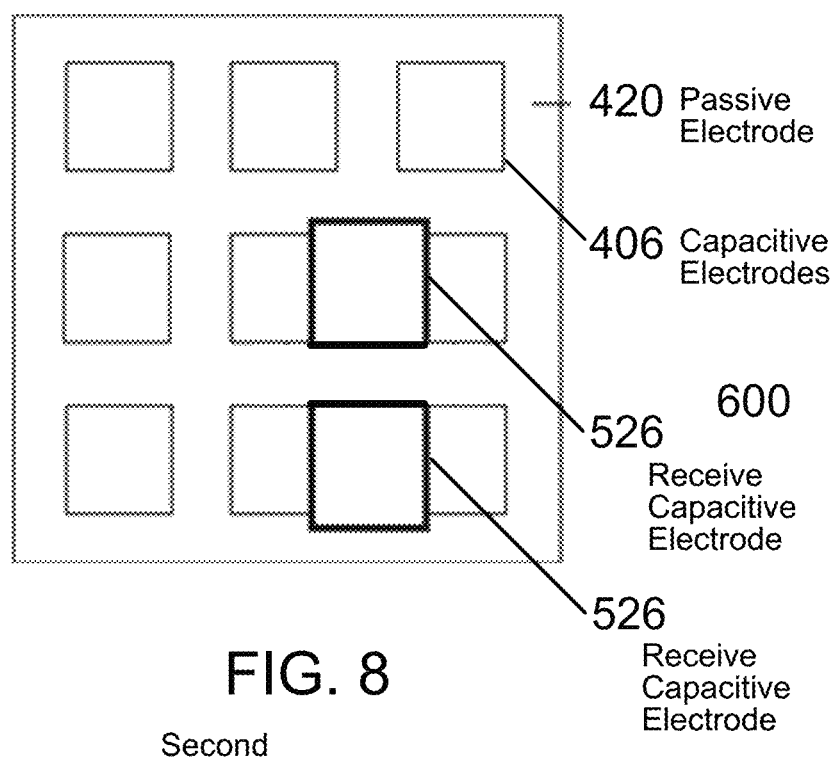
FIG. 8 is a plan view of another embodiment of a partial wireless power transfer system comprising the transmit resonator of FIG. 6.

FIG. 8 shows a partial wireless power transfer system generally identified by reference numeral 600. The wireless power transfer system 600 is identical to the previously-described wireless power transfer system 500 unless otherwise stated. The wireless power transfer system 600 comprises the transmitter 502 comprising the transmit resonator 400. In this embodiment, the capacitive electrodes 406 of the transmit resonator 400 are arranged in the grid pattern, where N (the number of columns in the grid) is 3 and M (the number of rows in the grid) is 3.

The wireless power transfer system 600 further comprises the receiver 510. In this embodiment, the receive capacitive electrodes 526 only partially overlap the capacitive electrodes 406 of the transmit resonator 400. In this embodiment, the receive capacitive electrodes 526 are not aligned with the capacitive electrodes 406 of the transmit resonator 400.

During operation, the first detector 408 may still detect sufficient impedances from the receive resonator 520 to resonate two capacitive electrodes 406 of the transmit resonator 400 and the inductors 402 to generate an electric field that are partially overlapped by the receive capacitive electrodes 526, and to resonate two other capacitive electrodes 406 of the transmit resonator 400 and the inductors 402 that are also partially overlapped by the receive capacitive electrodes 526. The receive resonator 520 resonates at the resonant frequency of the transmit resonator 400 and extracts power via resonant electric field coupling from both of the generated electric fields. While efficiency of the power transfer from each individual electric field may be less than the efficiency of the power transfer from a single electric field generated when the receive capacitive electrodes 526 and the capacitive electrodes 406 of the transmit resonator 400 are aligned, some amount of wireless power transfer may still occur.

Figure 9:
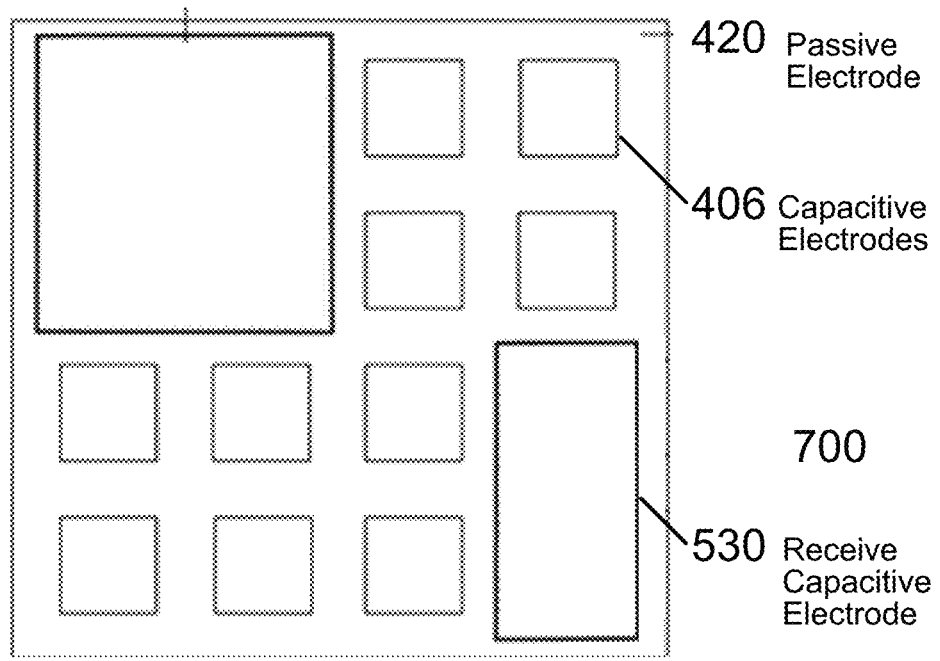
FIG. 9 is a plan view of another embodiment of a partial wireless power transfer system comprising the transmit resonator of FIG. 6.

While a particular wireless power transfer system 500 with a single receiver 510 has been described, one of skill in the art will appreciate that the wireless power transfer system may comprise multiple receivers. FIG. 9 shows a partial wireless power transfer system generally identified by reference numeral 700. The wireless power transfer system 700 is identical to the previously-described wireless power transfer system 500 unless otherwise stated. The wireless power transfer system 700 comprises the transmitter 502 comprising the transmit resonator 400. In this embodiment, the capacitive electrodes 406 of the transmit resonator 400 are arranged in the grid pattern, where N (the number of columns in the grid) is 4 and M (the number of rows in the grid) is 4.

The wireless power transfer system 700 further comprises the receiver 510 comprising the receive resonator 520. The two receive capacitive electrodes 526 of the receive resonator 520 overlap and are aligned with two of the capacitive electrodes 406 of the transmit resonator 400 such that power is transferred from the transmit resonator 400 to the receive resonator 520 via resonant electric field coupling.

The wireless power transfer system 700 further comprises a second receiver. The second receiver is identical to the receiver 510 unless otherwise stated. The second receiver comprises a second receive resonator comprising four capacitive receive electrodes. The second receive resonator further comprises a second receive passive electrode 704.

The second receive passive electrode 704 is as described in U.S. patent application Ser. No. 16/138,344 filed on Sep. 21, 2018, the relevant portions of which are incorporated herein by reference. The second receive passive electrode 704 encompasses the receive capacitive electrodes of the second receive resonator to at least partially eliminate environmental influences affecting the receive capacitive electrodes. The second receive passive electrode 704 is adjacent the receive capacitive electrodes of the second receive resonator. The second receive passive electrode 704 and the receive capacitive electrodes of the second receive resonator have parallel planes. The second receive passive electrode 704 comprises an elongate element. The elongate element is formed of electrically conductive material. The elongate element is in the form of a generally rectangular, planar plate with opposed major surfaces.

In this embodiment, the capacitive receive electrodes of the second receiver are arranged in a 2×2 grid pattern with identical spacing between adjacent electrodes to the capacitive electrodes 406 of the transmit resonator 400. The capacitive receive electrodes of the second receive resonator are dimensioned identically to the capacitive electrodes 406 of the transmit resonator 400. The receive capacitive electrodes of the second receive resonator overlap and are aligned with four of the capacitive electrodes 406 of the transmit resonator 400 such that power is transferred from the transmit resonator 400 to the second receive resonator via resonant electric field coupling.

As illustrated in FIG. 9, the transmit resonator 400 may provide power to multiple receiver resonators at the same time. As the first detector 408 detects impedances at each of the capacitive electrodes 406 of the transmit resonator 400, the first detector 408 detects multiple impedances at multiple capacitive electrodes 406 when multiple receiver resonators are presented to the transmit resonator 400.

Figure 10:
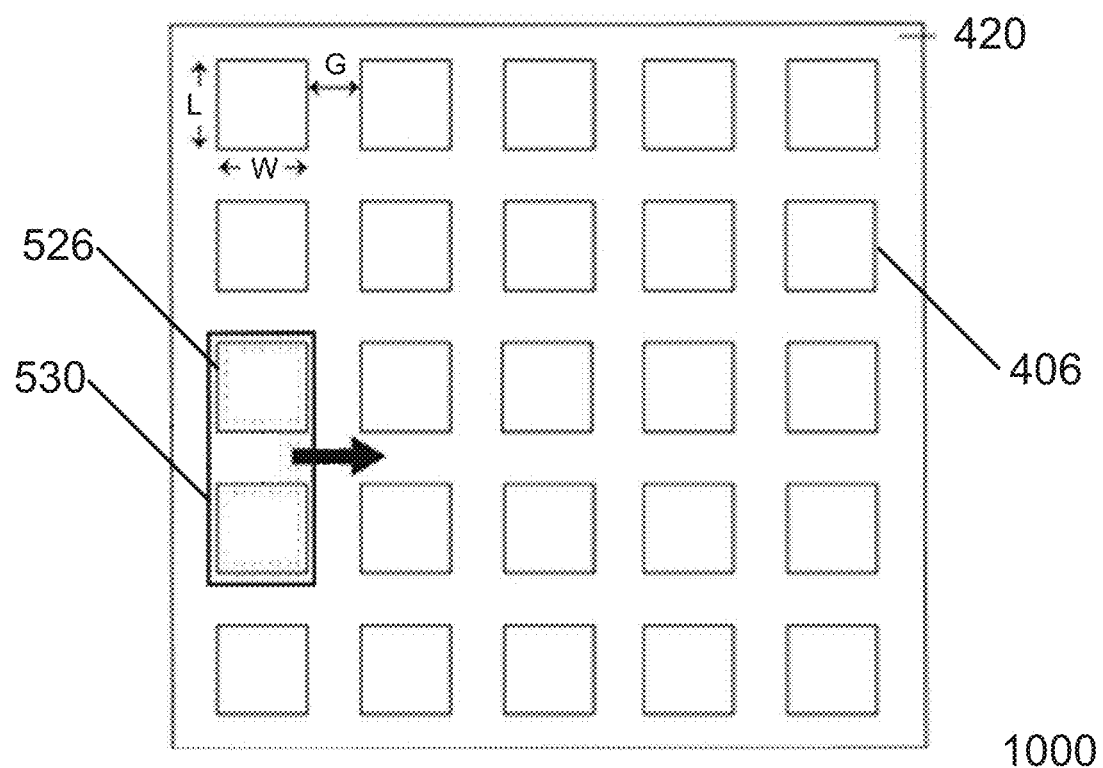
FIG. 10 is a plan view of another embodiment of a partial wireless power transfer system comprising the transmit resonator of FIG. 6.

While a particular wireless power transfer system 500 has been described, one of skill in the art will appreciate that other configurations are possible. FIG. 10 shows a partial wireless power transfer system generally identified by reference numeral 1000. The wireless power transfer system 1000 is identical to the previously-described wireless power transfer system 500 unless otherwise stated. In this embodiment, the capacitive electrodes 406 of the transmit resonator 400 are arranged in the grid pattern, where N (the number of columns in the grid) is 5 and M (the number of rows in the grid) is 5. Each transmit capacitive electrodes 406 has a width (W) of 50 mm and a length (L) of 50 mm. The gap (G) between adjacent capacitive electrodes 406 is 10 mm. The receive capacitive electrodes 526 are shown only to illustrate their locations. One of skill in the art will appreciate that the receive passive electrode 530 would block the view of the receive capacitive electrodes 526 during operation. Similar to the capacitive electrodes 406 of the transmit resonator 400, each receive capacitive electrode 526 has a width (W) of 50 mm and a length (L) of 50 mm. Furthermore, each receive capacitive electrode 526 is separated by a gap (G) of 10 mm. The wireless power transfer system 500 is operated at a resonant frequency of 13.56 MHz. The inductance of the inductors 402 (not shown) is 60 µH.

Figure 11:
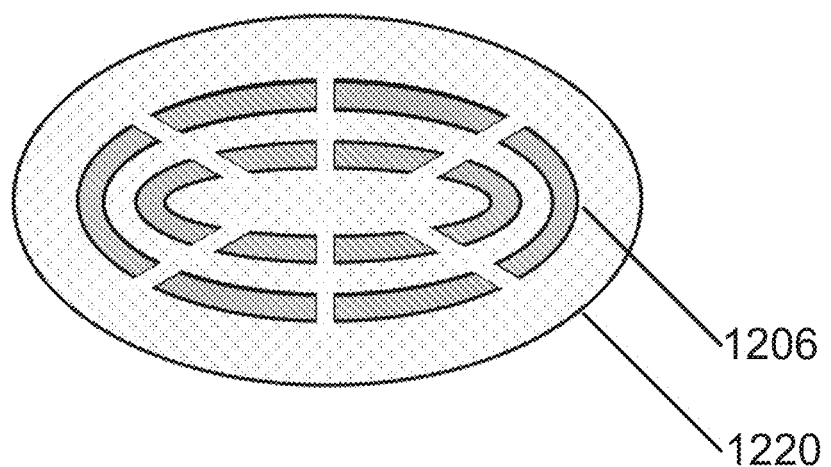
FIG. 11 is a plan view of another embodiment of the capacitive electrodes and passive electrode of the transmit resonator of FIG. 3.

While particular capacitive electrodes 306 and 406 have been described, one of skill in the art will appreciate that other configurations are possible. FIG. 11 shows another embodiment of capacitive electrodes generally identified by reference numeral 1206 and a passive electrode 1220 of a transmit resonator.

The capacitive electrodes 1206 and the passive electrode 1220 are identical to the capacitive electrodes 306 and passive electrode 320, respectively, unless otherwise stated. In this embodiment, the capacitive electrodes 1206 comprise twelve (12) capacitive electrodes. The capacitive electrodes 1206 are arranged in a circular pattern. The capacitive electrodes 1206 are generally arranged in two rings, an inner ring and an outer ring. The inner ring is surrounded by the outer ring. Each capacitive electrode 1206 is a segment of one of the inner and outer ring. The capacitive electrodes 1206 are coplanar in the x-y plane. In this embodiment, each capacitive electrode 1206 is a planar electrode. Each capacitive electrode 1206 is a segment of a generally circular ring.

The passive electrode 1220 comprises an element. The element is formed of electrically conductive material. The element is in the form of a generally circular, planar plate with opposed major surfaces. The element encompasses the outer and inner ring. The plane defined by the passive electrode 1220 is parallel with the plane defined by the capacitive electrodes 1206.

The wireless power transfer system 500 comprises the transmitter 502 comprising the transmit resonator 400 having inductors 402 that have static inductance. The static inductance of the inductors 402 may limit the ability to utilize multiple capacitive electrodes 406 of the transmit resonator 400 to transfer power. Transferring power through multiple capacitive electrodes 406 of the transmit resonator 400 may change the transmit-side capacitance, causing the wireless power transfer system 500 to detune, significantly reducing wireless power transfer efficiency and increasing losses.

Figure 12:
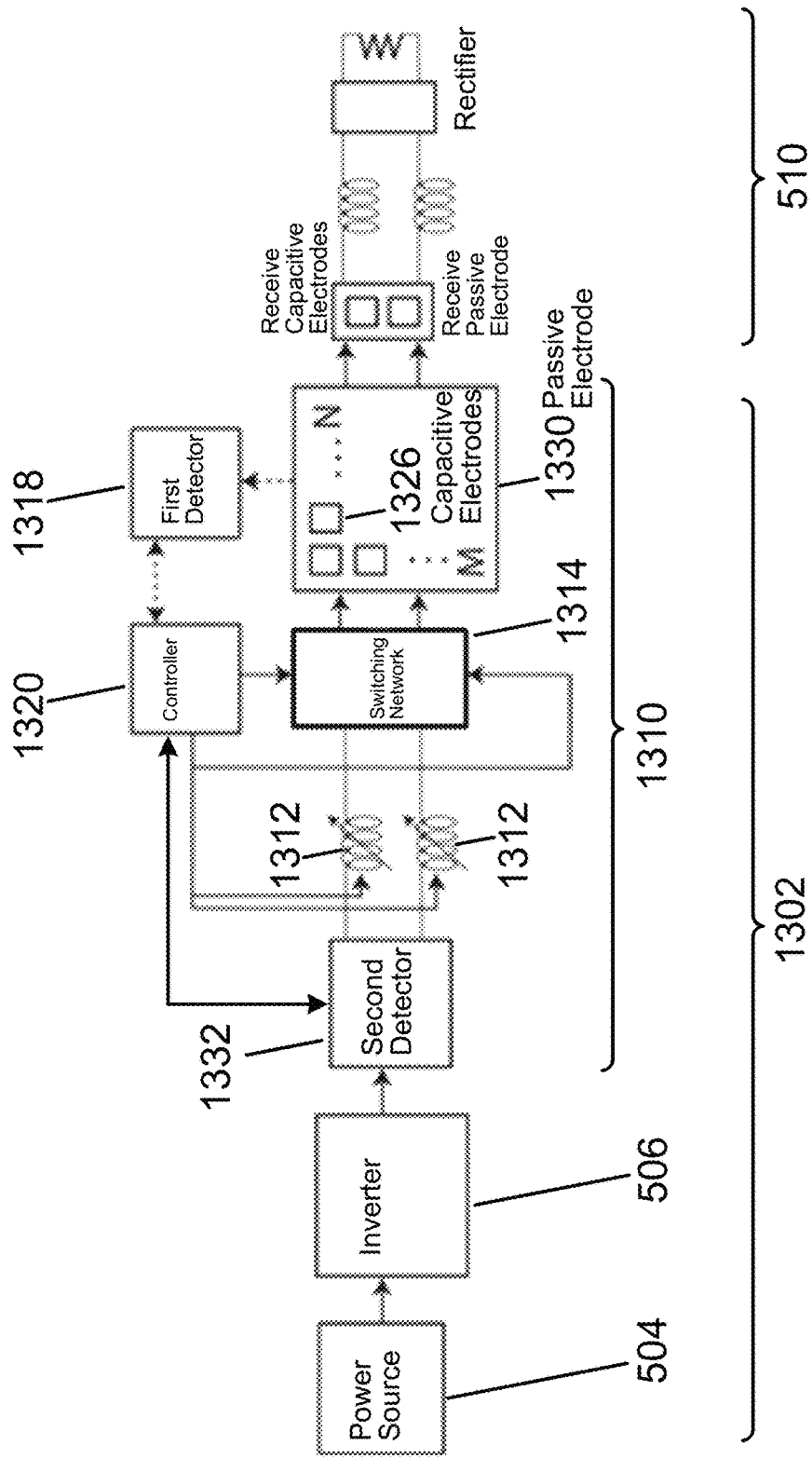
FIG. 12 is a schematic layout of another embodiment of the wireless power transfer system of FIG. 7.

While a particular wireless power transfer system 500 has been described, one of skill in the art will appreciate that other configurations are possible. FIG. 12 shows another embodiment of a wireless power transfer system generally identified by reference numeral 1300. The wireless power transfer system 1300 is identical to the previously-described wireless power transfer system 500 unless otherwise stated. The wireless power transfer system 1300 comprises a transmitter 1302 and the receiver 510.

The transmitter 1302 comprises the power source 504, the inverter 506 and a transmit resonator 1310. The power source 504 is electrically connected to the inverter 506 which is electrically connected to the transmit resonator 1310. The transmit resonator 1310 comprises two variable inductors 1312, a switching network 1314, capacitive electrodes 1326, a detector and a controller 1320. In this embodiment, the transmit resonator 1310 further comprises a passive electrode 1330. The detector further comprises a first detector 1318 and a second detector 1332. The inverter 506 is electrically connected to the second detector 1332. The second detector 1332 is electrically connected to the variable inductors 1312. The second detector 1332 is communicatively connected to the controller 1320. The variable inductors 1312 are electrically connected to the switching network 1314. The controller 1320 is electrically connected to each variable inductor 1312. The switching network 1314 is electrically connected to the capacitive electrodes 1326. The controller 1320 is communicatively connected to the switching network 1314. The first detector 1318 is communicatively connected to the controller 1320.

In this embodiment, the first detector 1318 and second detector 1332 are communicatively connected to the controller 1320 via wired connections. Furthermore, in this embodiment, the controller 1320 is communicatively connected to the switching network 1314 via wired connection. One of skill in the art will appreciate that other configurations are possible. In another embodiment, the first detector 1318, second detector 1332 and/or switching network 1314 are not electrically connected to the controller 1320 via wired connections. The detectors 1318 and 1332 are configured to communicate detected impedances to the controller 1320 via wireless communication. The controller 1320 is configured to send a control signal to the switching network 1314 via wireless communication. Exemplary wireless communication schemes include WiFi™ and Bluetooth™.

The switching network 1314, capacitive electrodes 1326, controller 1320 and passive electrode 1330 are identical to the switching network 404, capacitive electrodes 406, controller 410 and passive electrode 420, respectively, previously described unless otherwise stated. The first detector 1318 and second detector 1332 are identical to the first detector 408 and the second detector 412, respectively, previously described unless otherwise stated.

In this embodiment, the variable inductors 1312 are configured to resonate with the capacitive electrodes 1326 at a resonant frequency to generate an electric field as will be described. In this embodiment, the inductors 1312 are ferrite core inductors. One of skill in the art however will appreciate that other cores are possible. Furthermore, one of skill in the art will appreciate that more than two inductors 1312 or fewer than two inductors 1312 may be used.

During operation the wireless power system 1300 operates identically to the wireless power system 500, unless otherwise stated. The controller 1320 receives impedances from the first detector 1318 and the second detector 1332, and adjusts the inductances of the variable inductors 1312 to maximize electric field coupling.

Figure 13:
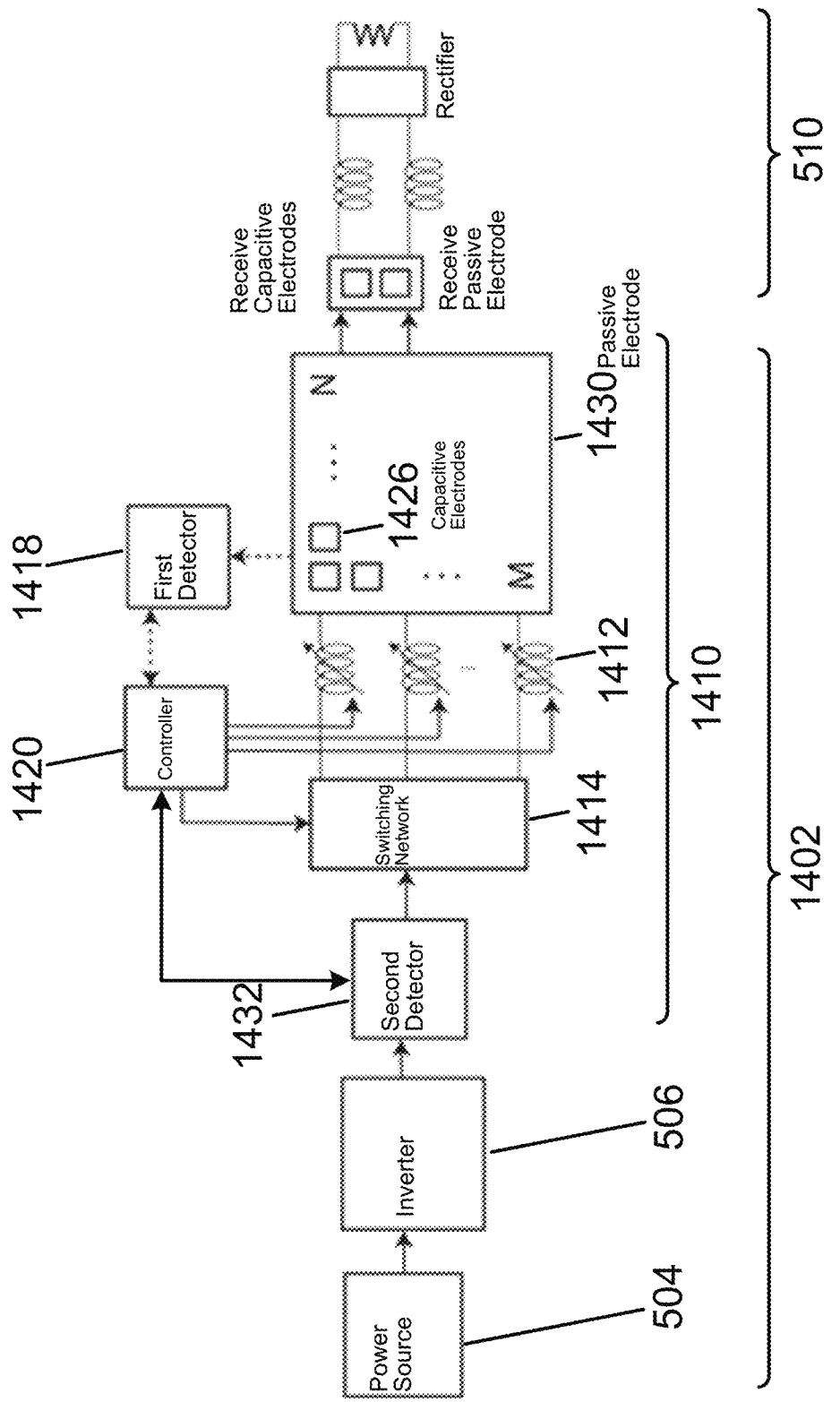
FIG. 13 is a schematic layout of another embodiment of the wireless power transfer system of FIG. 7.

While a particular wireless power transfer system 500 has been described, one of skill in the art will appreciate that other configurations are possible. FIG. 13 shows another embodiment of a wireless power transfer system generally identified by reference numeral 1400. The wireless power transfer system 1400 is identical to the previously-described wireless power transfer system 500 unless otherwise stated. The wireless power transfer system 1400 comprises a transmitter 1402 and the receiver 510.

The transmitter 1402 comprises the power source 504, the inverter 506 and a transmit resonator 1410. The power source 504 is electrically connected to the inverter 506 which is electrically connected to the transmit resonator 1410. The transmit resonator 1410 comprises variable inductors 1412, a switching network 1414, capacitive electrodes 1426, a detector and a controller 1420. In this embodiment, the transmit resonator 1410 further comprises a passive electrode 1430. The detector further comprises a first detector 1418 and a second detector 1432. The inverter 506 is electrically connected to the second detector 1432. The second detector 1432 is electrically connected to switching network 1414. The second detector 1432 is communicatively connected to the controller 1420. The switching network 1414 is electrically connected to the variable inductors 1412. The variable inductors 1412 are electrically connected to the capacitive electrodes 1426. The first detector 1418 is communicatively connected to the controller 1420. The controller 1420 is electrically connected to each variable inductor 1412 and to the switching network 1414. The controller 1420 is communicatively connected to the switching network 1414. The first detector 1418 is communicatively connected to the controller 1420.

In this embodiment, the first detector 1418 and second detector 1432 are communicatively connected to the controller 1420 via wired connections. Furthermore, in this embodiment, the controller 1420 is communicatively connected to the switching network 1414 via wired connection. One of skill in the art will appreciate that other configurations are possible. In another embodiment, the first detector 1418, second detector 1432 and/or switching network 1414 are not electrically connected to the controller 1420 via wired connections. The detectors 1418 and 1432 are configured to communicate detected impedances to the controller 1420 via wireless communication. The controller 1420 is configured to send a control signal to the switching network 1414 via wireless communication. Exemplary wireless communication schemes include WiFi™ and Bluetooth™.

The switching network 1414, capacitive electrodes 1426, controller 1420 and passive electrode 1430 are identical to the switching network 404, capacitive electrodes 406, controller 410 and passive electrode 420, respectively, previously described unless otherwise stated. The first detector 1418 and second detector 1432 are identical to the first detector 408 and the second detector 412, respectively, previously described unless otherwise stated.

In this embodiment, there is one variable inductor 1412 for each capacitive electrode 1426. Each capacitive electrode 1426 is connected to the switching network 1414 via a single variable inductor 1412. The variable inductors 1412 are configured to resonate with the capacitive electrodes 1426 at a resonant frequency to generate an electric field as will be described. In this embodiment, the inductors 1412 are ferrite core inductors. One of skill in the art however will appreciate that other cores are possible.

During operation the wireless power system 1400 operates identically to the wireless power system 500, unless otherwise stated. The controller 1420 receives impedances from the first detector 1418 and the second detector 1432, and adjusts the inductances of the variable inductors 1412 to maximize electric field coupling. The switching network 1414 opens or closes connections between the variable inductors 1412 and second detector 1432 such that only capacitive electrodes 1426 that are presented with a receive resonator are resonated with their associated variable inductors 1412 to generate an electric field.

Figure 14:
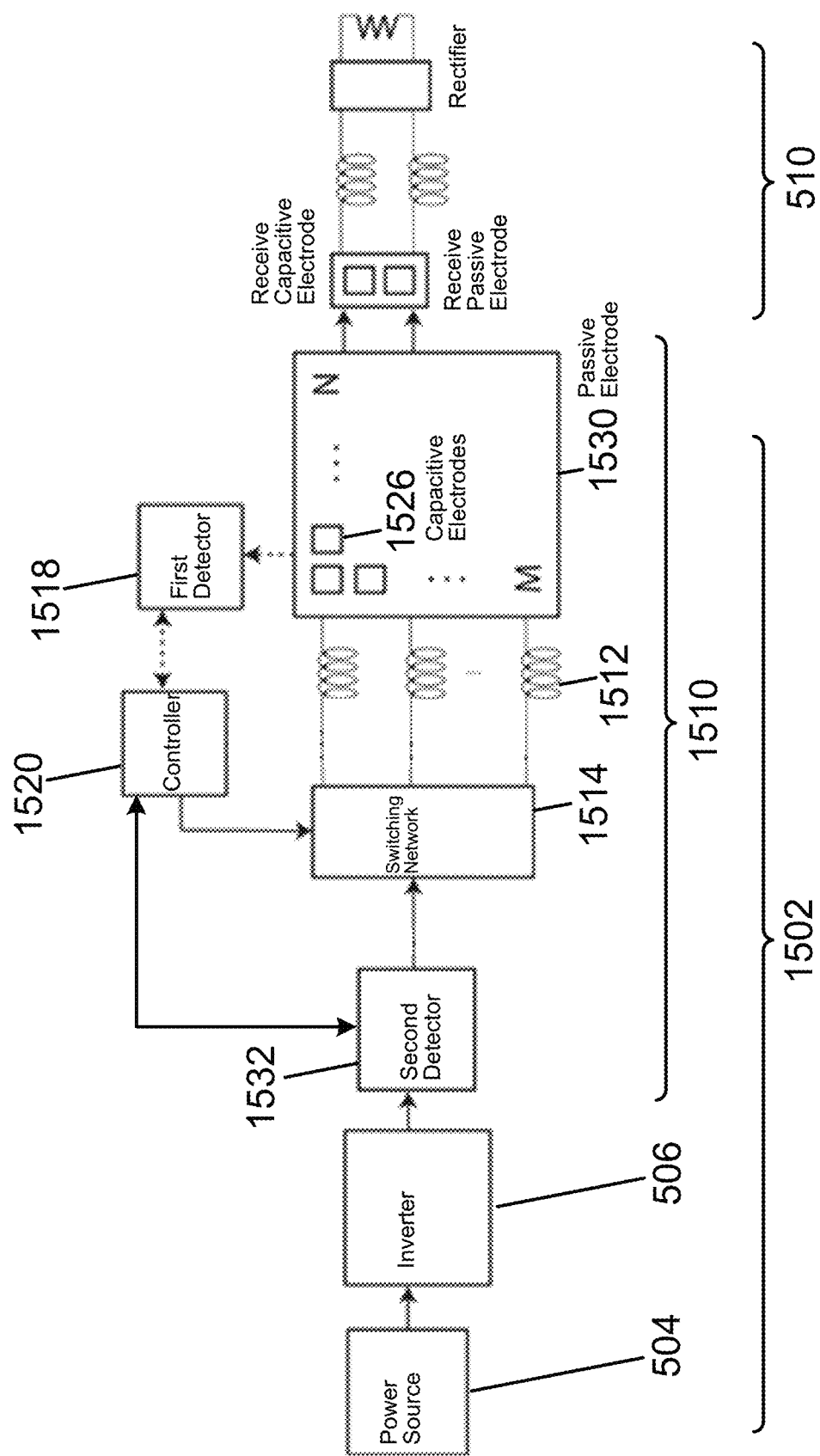
FIG. 14 is a schematic layout of another embodiment of the wireless power transfer system of FIG. 7.

While a particular wireless power transfer system 500 has been described, one of skill in the art will appreciate that other configurations are possible. FIG. 14 shows another embodiment of a wireless power transfer system generally identified by reference numeral 1500. The wireless power transfer system 1500 is identical to the previously-described wireless power transfer system 1400 unless otherwise stated. The wireless power transfer system 1500 comprises a transmitter 1502 and the receiver 510.

The transmitter 1502 comprises the power source 504, the inverter 506 and a transmit resonator 1510. The power source 504 is electrically connected to the inverter 506 which is electrically connected to the transmit resonator 1510. The transmit resonator 1510 comprises inductors 1512, a switching network 1514, capacitive electrodes 1526, a detector and a controller 1520. In this embodiment, the transmit resonator 1510 further comprises a passive electrode 1530. The detector further comprises a first detector 1518 and a second detector 1532. The inverter 506 is electrically connected to the second detector 1532. The second detector 1532 is electrically connected to switching network 1514. The second detector 1532 is communicatively connected to the controller 1520. The switching network 1514 is electrically connected to the inductors 1512. The inductors 1512 are electrically connected to the capacitive electrodes 1526. The first detector 1518 is communicatively connected to the controller 1520. The switching network 1514 is electrically connected to each inductor 1512. The controller 1520 is communicatively connected to the switching network 1514.

In this embodiment, the first detector 1518 and second detector 1532 are communicatively connected to the controller 1520 via wired connections. Furthermore, in this embodiment, the controller 1520 is communicatively connected to the switching network 1520 via wired connection. One of skill in the art will appreciate that other configurations are possible. In another embodiment, the first detector 1518, second detector 1532 and/or switching network 1514 are not electrically connected to the controller 1520 via wired connections. The detectors 1518 and 1532 are configured to communicate detected impedances to the controller 1520 via wireless communication. The controller 1520 is configured to send a control signal to the switching network 1514 via wireless communication. Exemplary wireless communication schemes include WiFi™ and Bluetooth™.

In this embodiment, there is one inductor 1512 for each capacitive electrode 1526. Each capacitive electrode 1526 is connected to the switching network 1514 via a single inductor 1512. The inductors 1512 are configured to resonate with the capacitive electrodes 1526 at a resonant frequency to generate an electric field as will be described. The inductors 1512 are static inductors. In this embodiment, the inductors 1512 are ferrite core inductors. One of skill in the art however will appreciate that other cores are possible.

During operation the wireless power system 1500 operates identically to the wireless power system 1400, except that the inductors 1512 are static inductors.

Figure 15:
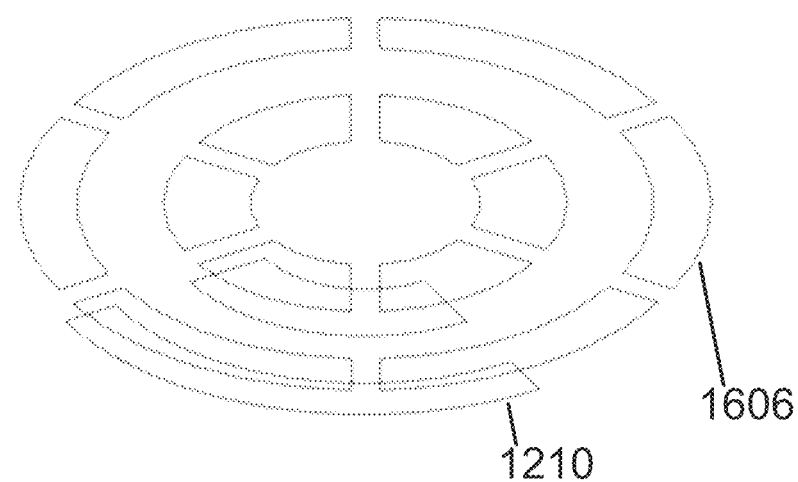
FIG. 15 is a plan view of another embodiment of a partial wireless power transfer system in accordance with an aspect of the system.

While a particular wireless power transfer system 500 has been described, one of skill in the art will appreciate that other configurations are possible. FIG. 15 shows another embodiment of a partial wireless power transfer system generally identified by reference numeral 1600. The wireless power transfer system 1600 is identical to the wireless power transfer system 500 unless otherwise stated. The wireless power transfer system 1600 comprises a transmitter and a receiver. The transmitter comprises a power source (not shown), an inverter (not shown) and a transmit resonator. The power source is electrically connected to the inverter. The inverter is electrically connected to the transmit resonator.

The transmit resonator is configured to generate an electric field to transfer power to one or more receive resonators as previously described. The transmit resonator comprises two inductors (not shown) and two transmit capacitive electrodes 1210. The inductors are electrically connected to the transmit capacitive electrodes 1210. The transmit capacitive electrodes 1210 are segments of rings. The transmit capacitive electrodes 1210 comprise a first segment that is a segment of an outer ring and a second segment that is a segment of an inner ring. In this embodiment, each transmit capacitive electrode 1210 is a planar electrode. The transmit capacitive electrodes 1210 are coplanar.

The receiver comprises a receive resonator, a load (not shown) and a rectifier (not shown). The load is electrically connected to the rectifier. The rectifier is electrically connected to the receive resonator. The load and rectifier are identical to the load 512 and rectifier 514, respectively, and will not be described further. The receive resonator is configured to extract power from the electric field generated by the transmit resonator 400 via resonant electric field coupling. The receive resonator comprises two inductors (not shown), receive capacitive electrodes 1606, a switching network (not shown), a detector and a controller (not shown). The switching network, detector and controller are identical to the previously described switching network 404, detector and controller 410, respectively, of the transmit resonator 400 unless otherwise stated. The inductors are electrically connected to the receive capacitive electrodes 1606.

The receive capacitive electrodes 1606 are identical to the capacitive electrodes 406 unless otherwise stated. In this embodiment, the receive capacitive electrodes 1606 comprise twelve (12) capacitive electrodes. The receive capacitive electrodes 1606 are arranged in a circular pattern. The receive capacitive electrodes 1606 are generally arranged in two rings, an inner ring and an outer ring. The inner ring is surrounded by the outer ring. Each receive capacitive electrode 1606 is a segment of one of the inner or outer rings. The receive capacitive electrodes 1606 are coplanar. In this embodiment, each receive capacitive electrode 1606 is a planar electrode.

Figure 16:
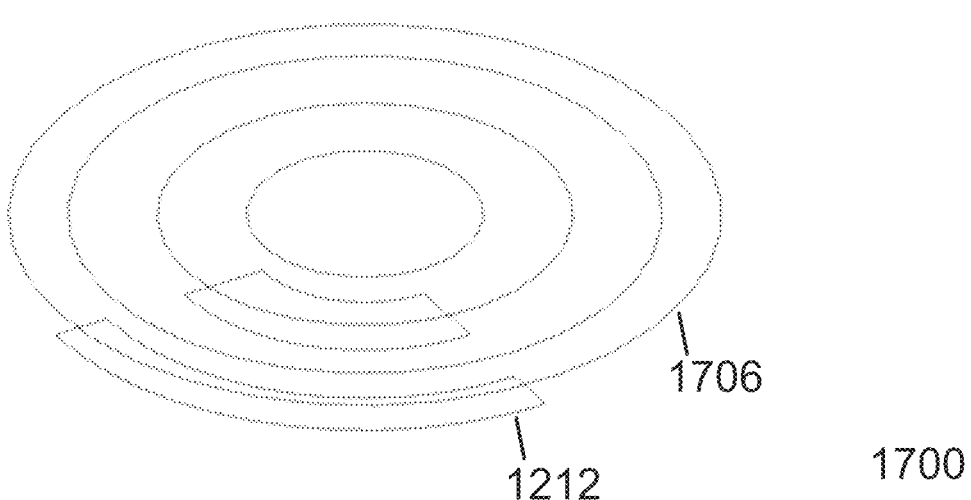
FIG. 16 is a plan view of another embodiment of a partial wireless power transfer system.

FIG. 16 shows another embodiment of a partial wireless power transfer system generally identified by reference numeral 1700. The wireless power transfer system 1700 is identical to the wireless power transfer system 1600 unless otherwise stated. The wireless power transfer system 1700 comprises a transmitter and a receiver. The transmitter comprises a power source (not shown), an inverter (not shown) and a transmit resonator. The power source is electrically connected to the inverter. The inverter is electrically connected to the transmit resonator.

The transmit resonator is configured to generate an electric field to transfer power to one or more receive resonators as previously described. The transmit resonator comprises two inductors (not shown) and two transmit capacitive electrodes 1212. The inductors are electrically connected to the transmit capacitive electrodes 1212. The transmit capacitive electrodes 1212 are segments of rings. The transmit capacitive electrodes 1212 comprise a first segment that is a segment of an outer ring and a second segment that is a segment of an inner ring. In this embodiment, each transmit capacitive electrode 1212 is a planar electrode. The transmit capacitive electrodes 1212 are coplanar.

The receiver comprises a receive resonator, a load (not shown) and a rectifier (not shown). The load is electrically connected to the rectifier. The rectifier is electrically connected to the receive resonator. The load and rectifier are identical to the load 512 and rectifier 514, respectively, and will not be described further. The receive resonator is configured to extract power from the electric field generated by the transmit resonator 400 via resonant electric field coupling. The receive resonator comprises two receive inductors (not shown), and two receive capacitive electrodes 1706. The inductors are electrically connected to the receive capacitive electrodes 1706.

The receive capacitive electrodes 1706 are identical to the capacitive electrodes 406 unless otherwise stated. In this embodiment, the receive capacitive electrodes 1706 comprise two ring electrodes, an outer ring electrode and an inner ring electrode. The inner ring electrode is surrounded by the outer ring electrode. The receive capacitive electrodes 1706 are coplanar. In this embodiment, each receive capacitive electrode 1706 is a planar electrode.

Simulations were performed on the wireless power transfer systems 1600 and 1700. As shown in FIG. 15, the two transmit capacitive electrodes 1210 overlap and are aligned with two of the receive capacitive electrodes 1606.

In this embodiment, the outer receive capacitive electrodes 1606 and the outer transmit capacitive electrodes 1210 have an outer radius of 1200 mm and an inner radius of 1000 mm. The inner receive capacitive electrodes 1606 and the inner transmit capacitive electrodes 1210 have an outer radius of 700 mm and an inner radius of 400 mm. Each receive capacitive electrode 1606 is separated from the adjacent receive capacitive electrode 1606 in the same ring by 100 mm. The gap between the outer radius of the inner receive capacitive electrodes 1606 and the inner radius of the outer receive capacitive electrodes 1606 is 300 mm. Similarly, the gap between the outer radius of the inner transmit capacitive electrodes 1210 and the inner radius of the outer transmit capacitive electrodes 1210 is 300 mm. The wireless power transfer system 1600 delivers 45 watts of power from the transmit resonator to the receive resonator. The separation distance between the transmit resonator and the receive resonator is 100 mm. The radiofrequency (RF) efficiency of the power transfer between the resonators is 98.2%. The resonant frequency of the wireless power transfer system 1600 is 13.56 MHz. The inductance of the inductors of the transmit resonator is 5.7 µH. The inductance of the inductors of the receive resonator is 8.8 µH.

As shown in FIG. 16, the transmit capacitive electrodes 1212 overlap the receive capacitive electrodes 1706. In this embodiment, the outer receive capacitive electrodes 1706 and the outer transmit capacitive electrodes 1212 have an outer radius of 1200 mm and an inner radius of 1000 mm. The inner receive capacitive electrodes 1706 and the inner transmit capacitive electrodes 1212 have an outer radius of 700 mm and an inner radius of 400 mm. The gap between the outer radius of the inner receive capacitive electrodes 1706 and the inner radius of the outer receive capacitive electrodes 1706 is 300 mm. Similarly, the gap between the outer radius of the inner transmit capacitive electrodes 1212 and the inner radius of the outer transmit capacitive electrodes 1212 is 300 mm. The wireless power transfer system 1700 delivers 45 watts of power from the transmit resonator to the receive resonator. The separation distance between the transmit resonator and the receive resonator is 100 mm. The RF efficiency of the power transfer between the resonators is 97.8%. The resonant frequency of the wireless power transfer system 1700 is 13.56 MHz. The inductance of the inductors of the transmit resonator is 4.6 µH. The inductance of the inductors of the receive resonator is 1.2 µH.

Figure 17:
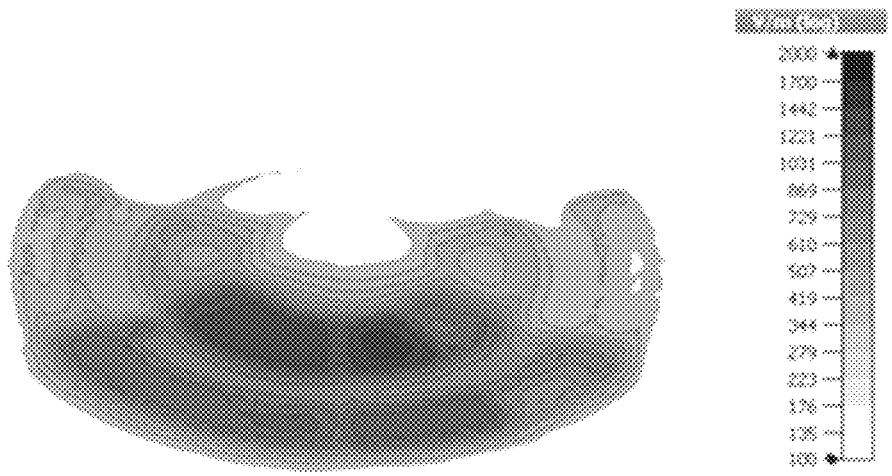
FIG. 17 is a graph of the electric field of the wireless power transfer system of FIG. 15.
Figure 18:
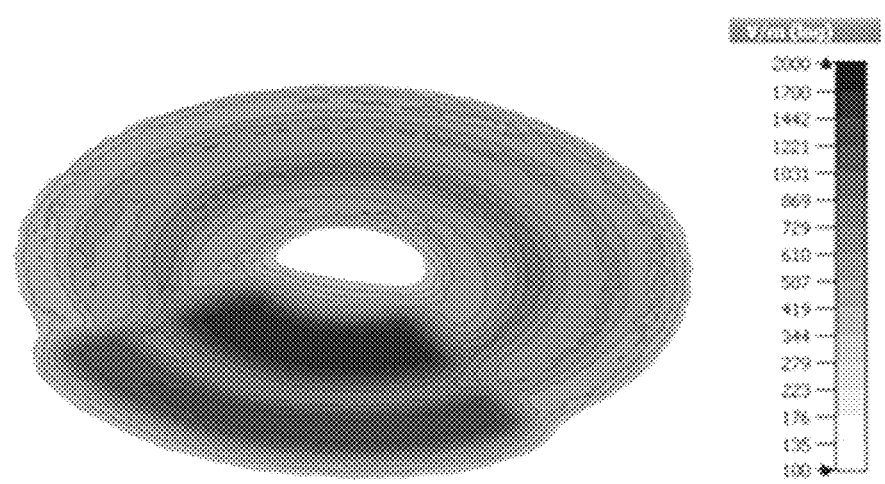
FIG. 18 is a graph of the electric field of the wireless power transfer system of FIG. 16.

The results of the simulation are shown in FIGS. 17 and 18. FIG. 17 is a graph of the electric field of the wireless power transfer system 1600. Specifically, FIG. 17 shows the electric field drawn on the center plane between the transmit resonator and receive resonator of the wireless power transfer system 1600.

FIG. 18 is a graph of the electric field of the wireless power transfer system 1700. Specifically, FIG. 18 shows the electric field drawn on the center plane between the transmit resonator and receive resonator of the wireless power transfer system 1700.

In both FIG. 17 and FIG. 18, the electric field is greater in the region where the transmit capacitive electrodes 1210 and 1212 overlap with the receive capacitive electrodes 1606 and 1706, respectively. The electric field of the wireless power transfer system 1600 in the area where the transmit capacitive electrodes 1210 do not overlap with the receive capacitive electrodes 1606 is lower than the electric field of the wireless power transfer system 1700 in the area where the transmit capacitive electrodes 1212 do not overlap with the receive capacitive electrodes 1706. Thus, the wireless power transfer system 1600 contains the electric field better than the wireless power transfer system 1700. Improved containment reduces human exposure to RF fields. Furthermore, improved containment prevents electromagnetic interference (EMI). In addition, improved containment reduces the specific absorption rate (SAR) value.

Figure 19:
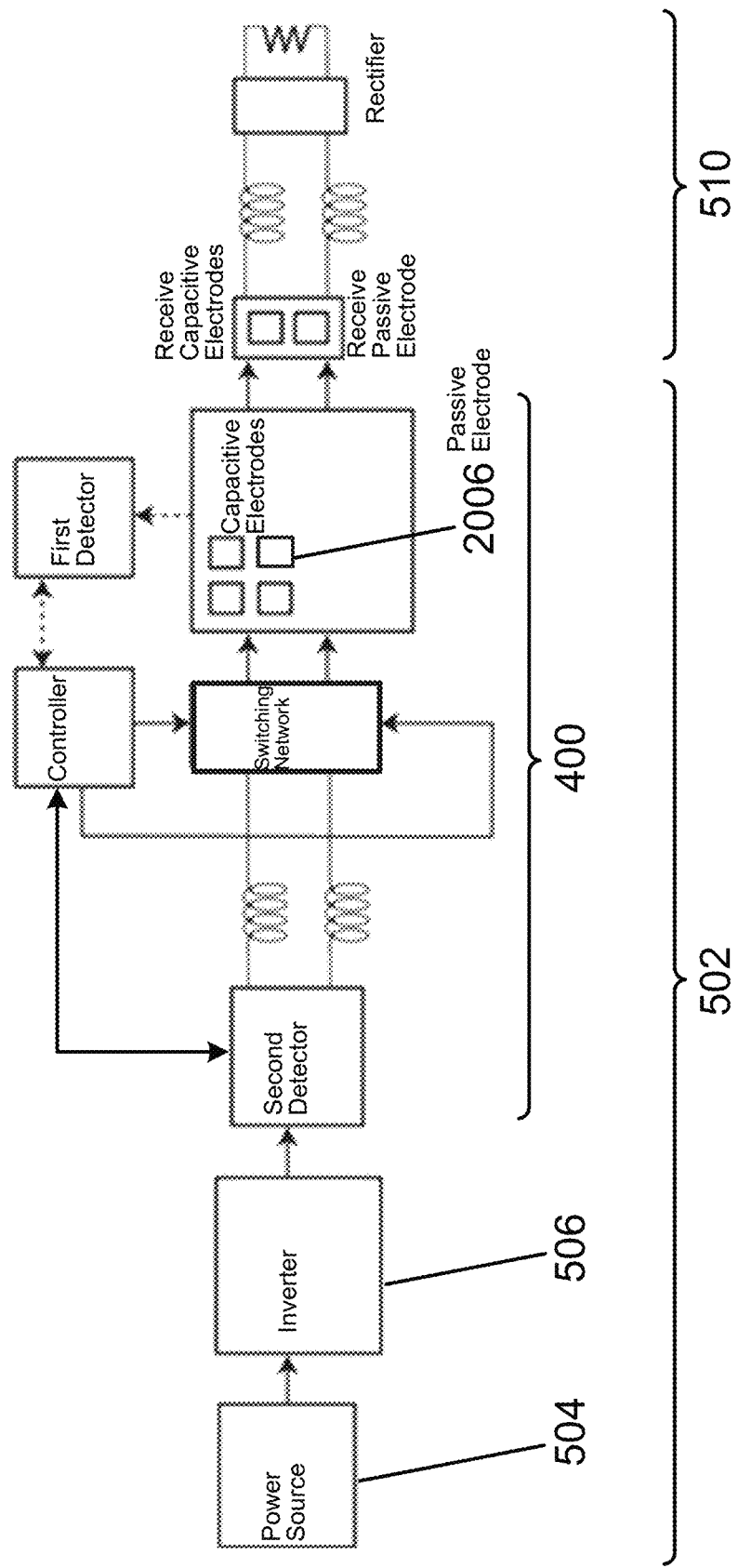
FIG. 19 is a schematic layout of another embodiment of the wireless power transfer system of FIG. 7.

While a particular wireless power transfer system 500 has been described, one of skill in the art will appreciate that other configurations are possible. FIG. 19 shows another embodiment of a wireless power transfer system generally identified by reference numeral 2000. The wireless power transfer system 2000 is identical to the wireless power transfer system 500 unless otherwise stated. In this embodiment, the transmit resonator comprises capacitive electrodes 2006 that are in a grid pattern, where N (the number of columns in the grid) is 2 and M (the number of rows in the grid) is 2. In this embodiment, the capacitive electrodes 2006 are rectangular plate electrodes.

Simulations were performed on the wireless power transfer system 2000. In this embodiment, each capacitive electrode 2006 has a length of 330 mm and a width of 100 mm. The gap between the long sides of the capacitive electrodes 2006 is 50 mm. The gap between the short sides of the capacitive electrodes 2006 is 30 mm. The receive capacitive electrodes 526 have a length of 330 mm and a width of 100 mm. The gap between the receive capacitive electrodes is 50 mm. The gap between the capacitive electrodes 2006 of the transmit resonator and the receive capacitive electrodes 526 is 25 mm.

During the simulation, the receive capacitive electrodes 526 move from initially being overlapping and aligned with the two of capacitive electrodes 2006 (Tx1) of the transmit resonator 400. The receive capacitive electrodes 526 then moved toward the other two capacitive electrodes 2006 (Tx2) of the transmit resonator 400 until they were overlapping and aligned with these other two capacitive electrodes 2006 of the transmit resonator 400.

Figure 20:
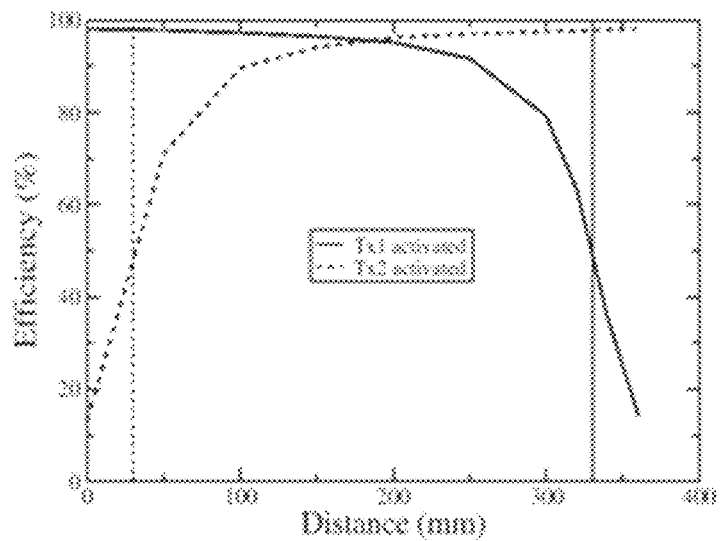
FIG. 20 is a graph of the radiofrequency (RF) efficiency of the wireless power transfer system of FIG. 19.

FIG. 20 is a graph of the RF efficiency of the wireless power transfer system 2000. The RF efficiency of the wireless power transfer system 2000 is defined as the efficiency of the wireless power transfer between the transmit resonator 400 and the receive resonator 510 of the wireless power transfer system 2000. The solid curved line in FIG. 20 represents when two capacitive electrodes 2006 (Tx1) of the transmit resonator 400 are active. The dashed curved line in FIG. 20 represents when the other two of the capacitive electrodes 2006 (Tx2) of the transmit resonator 400 are active. A distance of 0 mm indicates that the receive capacitive electrodes 526 are overlapping and aligned with Tx1. A distance of 360 mm indicates that the receive capacitive electrodes 526 are overlapping and aligned with Tx2.

The solid vertical line indicates the distance at which the receive capacitive electrodes 526 begin to overlap with Tx2. The dashed vertical line indicates the distance at which the receive capacitive electrodes 526 do not overlap with Tx1. By switching the capacitive electrode 2006 pair that is generating an electric field to transfer power to the receive resonator 510, the RF efficiency can remain greater than 90% during movement of the receive capacitive electrodes 526. For the distances between 150 to 250 mm, efficient wireless power transfer is achieved from either Tx1 or Tx2.

Figure 21:
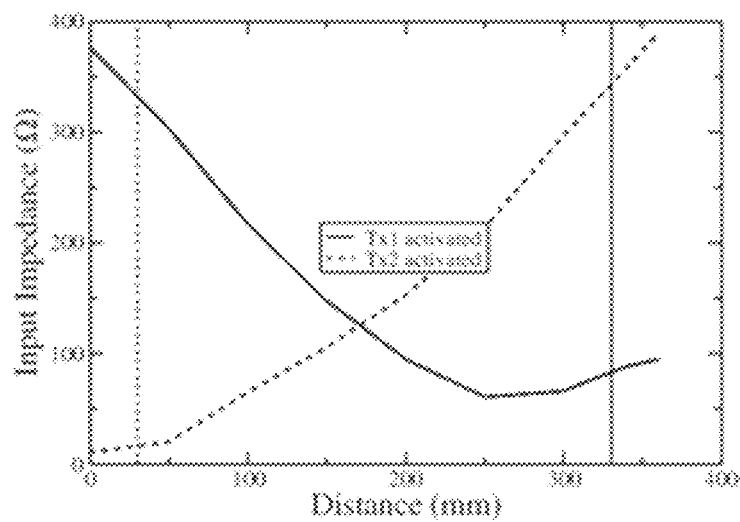
FIG. 21 is a graph of the input impedance of the wireless power transfer system of FIG. 19.

FIG. 21 is a graph of the input impedance of the transmit resonator 400 of the wireless power transfer system 2000. The solid curved line represents when Tx1 is generating an electric field to transfer power to the receive resonator 510, and Tx2 is not generating an electric field. The dashed curved line represents when Tx2 is generating an electric field to transfer power to the receive resonator 510, and Tx1 is not generating an electric field. When the receive capacitive electrodes 526 are overlapping and fully aligned with Tx1 or Tx2, the input impedance is approximately 380Ω. As the receive capacitive electrodes 526 moves away from either Tx1 or Tx2, the input impedance decreases. At a distance of 180 mm, the receive capacitive electrodes 526 are centered between Tx1 and Tx2 and the input impedance is 120Ω. In this embodiment, this value may be the threshold impedance. Thus, when any capacitive electrode 2006 pair is presented with an impedance of 120Ω or greater, the particular capacitive electrode 2006 resonates with inductors as previously described.

Figure 22:
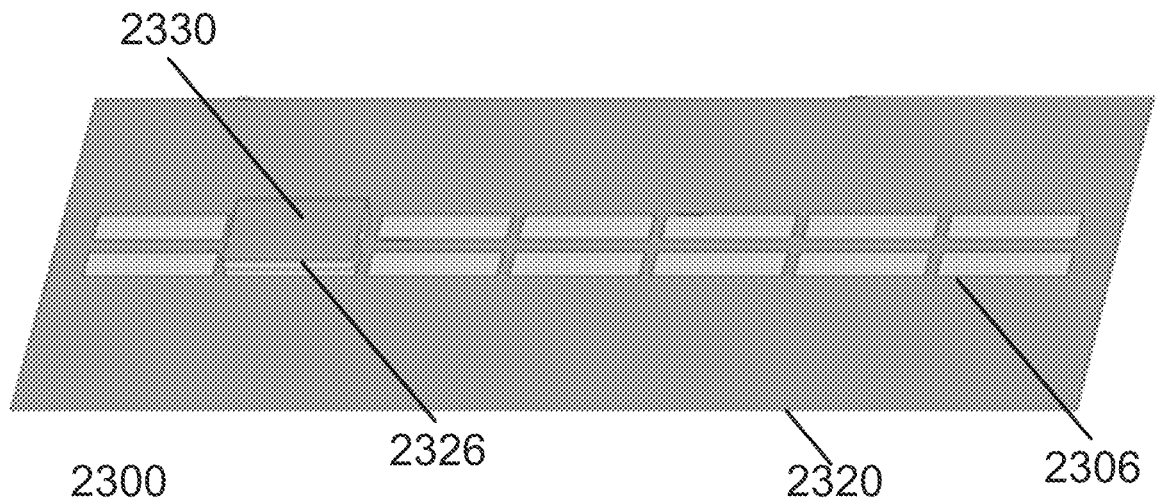
FIG. 22 is a perspective view of another embodiment of a partial wireless power transfer system in accordance with an aspect of the system.
Figure 23:
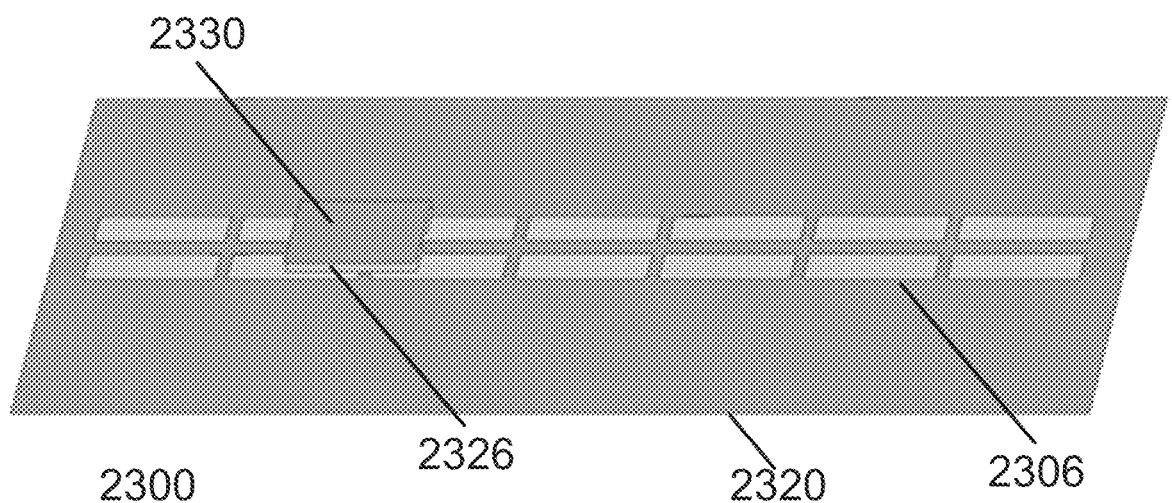
FIG. 23 is another perspective view of the wireless power transfer system of FIG. 22.

While a particular wireless power transfer system 500 has been described, one of skill in the art will appreciate that other configurations are possible. FIGS. 22 and 23 show another embodiment of a partial wireless power transfer system generally identified by reference numeral 2300. The wireless power transfer system 2300 is identical to the wireless power transfer system 500 unless otherwise stated.

In this embodiment, the transmit resonator comprises capacitive electrodes 2306 that are in a grid pattern, where N (the number of columns in the grid) is 7 and M (the number of rows in the grid) is 2. In this embodiment, the capacitive electrodes 2306 are rectangular plate electrodes. In this embodiment, the transmit resonator further comprises a transmit passive electrode 2320. The transmit passive electrode 2320 is identical to passive electrode 420 unless otherwise stated. The receive resonator comprises two capacitive electrodes 2326. The receiver further comprises a receive passive electrode 2330. The receive passive electrode 2330 is identical to receive passive electrode 530 unless otherwise stated.

Figure 24:
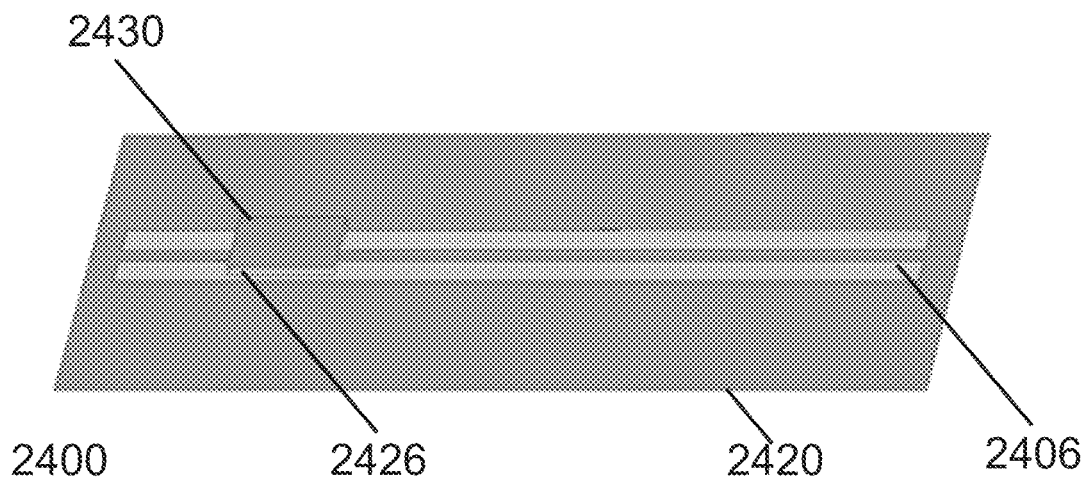
FIG. 24 is a perspective view of another embodiment of a partial wireless power transfer system.

FIG. 24 shows another embodiment of a partial wireless power transfer system generally identified by reference numeral 2400. The wireless power transfer system 2400 is identical to the wireless power transfer system 2300 unless otherwise stated.

In this embodiment, the transmit resonator comprises capacitive electrodes 2406 that are in a grid pattern, where N (the number of columns in the grid) is 1 and M (the number of rows in the grid) is 2. In this embodiment, the capacitive electrodes 2406 are rectangular plate electrodes. In this embodiment, the transmit resonator further comprises a transmit passive electrode 2420. The transmit passive electrode 2420 is identical to passive electrode 420 unless otherwise stated. The receive resonator comprises two capacitive electrodes 2426. The receiver further comprises a receive passive electrode 2430. The receive passive electrode 2430 is identical to receive passive electrode 530 unless otherwise stated.

Simulations were performed on the wireless power transfer systems 2300 and 2400. In this embodiment, each capacitive electrode 2306 of the transmit resonator has a length of 330 mm and a width of 100 mm. The gap between the long sides of the capacitive electrodes 2306 of the transmit resonator is 50 mm. The gap between the short sides of the capacitive electrodes 2306 is 30 mm. Each receive capacitive electrodes 2326 has a length of 330 mm and a width of 100 mm. The gap between receive capacitive electrodes 2326 is 50 mm. The gap between the capacitive electrodes 2306 of the transmit resonator and the receive capacitive electrodes 2326 is 25 mm. The gap between the capacitive electrodes 2306 of the transmit resonator and the transmit passive electrode 2320 is 25 mm. The gap between the receive capacitive electrodes 2326 and the receive passive electrode 2330 is 25 mm. The wireless power transfer system 2300 delivers 45 watts of power.

In this embodiment, each capacitive electrode 2406 is 2490 mm in length and 100 mm in width. The gap between the capacitive electrodes 2406 is 50 mm. Each receive capacitive electrodes 2426 has a length of 330 mm and a width of 100 mm. The gap between the receive capacitive electrodes 2426 is 50 mm. The gap between the capacitive electrodes 2406 of the transmit resonator and the receive capacitive electrodes 2426 is 25 mm. The gap between the capacitive electrodes 2406 of the transmit resonator and the transmit passive electrode 2420 is 25 mm. The gap between the receive capacitive electrodes 2426 and the receive passive electrode 2430 is 25 mm. The wireless power transfer system 2400 delivers 45 watts of power.

Figure 25:
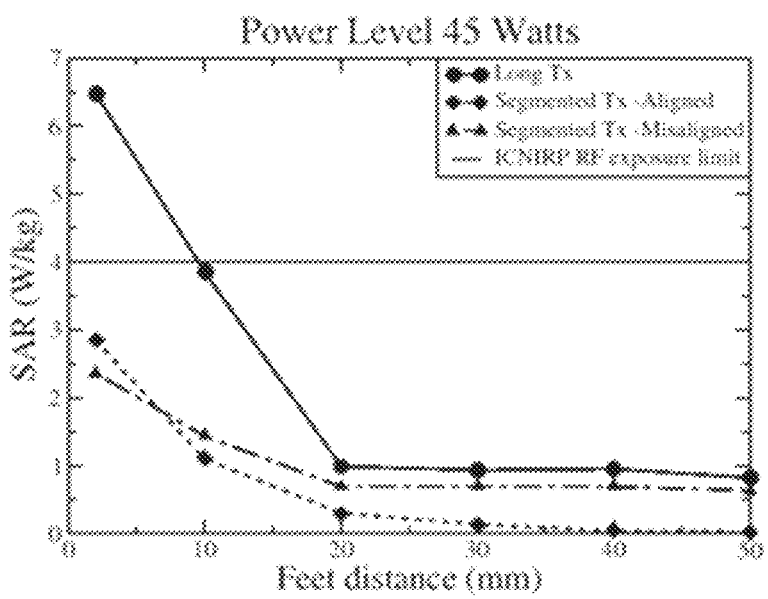
FIG. 25 is a graph of the Specific Absorption Rate (SAR) versus distance for the wireless power transfer systems of FIGS. 22 to 24.

The results of the simulations are shown in FIG. 25. FIG. 25 is a graph of the SAR in W/kg for a 10 gram average mass of human feet located 10 mm away and overhead from the transmit resonator. During the simulation, the receive capacitive electrodes 2326 were initially aligned with the two of capacitive electrodes 2306 of the transmit resonator as shown in FIG. 22. This configuration is labelled as "Segmented Tx—Aligned" in FIG. 25. The receive capacitive electrodes 2326 then moved toward the other two capacitive electrodes 2306 of the transmit resonator until the receive capacitive electrodes 2326 are between two sets of adjacent capacitive electrodes 2306 of the transmit resonator as shown in FIG. 23. This configuration is labelled as "Segmented Tx—Misaligned" in FIG. 25. The wireless power transfer system 2400 is labelled as "Long Tx" in FIG. 25. The International Commission on Non-Ionizing Radiation Protection (ICNIRP) RF exposure limit is labelled as "ICNIRP RF exposure limit" in FIG. 25.

As shown in FIG. 25, when the receive capacitive electrodes 2326 are aligned with the capacitive electrodes 2306 of the transmit resonator, the SAR for the wireless power transfer system 2300 is well below the ICNIRP RF exposure limit at distances between 1 and 50 mm. Similarly, when the receive capacitive electrodes 2326 are not overlapping and aligned with the capacitive electrodes 2306 of the transmit resonator, the SAR for the wireless power transfer system 2300 is still below the ICNIRP RF exposure limit at distances between 1 and 50 mm. The SAR for the wireless power transfer system 2400 is not below the ICNIRP RF exposure limit when the distance is less than approximately 9 mm. Clearly, the wireless power transfer system 2300 produces reduced SAR providing a generally safer wireless power transfer system.

While a particular operation of the first detector 308 and controller 310 has been described, one of skill in the art will appreciate that variations are possible. In one embodiment, the controller 310 requests the impedances presented to the capacitive electrodes 306 from the first detector 308. In response to the request from the controller 310, the first detector 308 sends the impedances presented to the capacitive electrodes 306 to the controller 310. The other embodiments of the first detector and controller discussed herein may function similarly. The embodiments of the second detector discussed herein may function similarly.

While a particular operation of the first detector 308 and controller 310 has been described, one of skill in the art will appreciate that variations are possible. In one embodiment, the controller 310 requests the impedance presented to a particular capacitive electrode 306 from the first detector 308. In response to the request from the controller 310, the first detector 308 sends the impedance presented to the particular capacitive electrode 306 to the controller 310. The controller 310 may make multiple impedance requests over a period of time. The controller 310 may request impedances presented to more than one capacitive electrode 306. The other embodiments of the first detector and controller discussed herein may function similarly. The embodiments of the second detector discussed herein may function similarly.

While particular first detectors 308 and 408 have been described, one of skill in the art will appreciate that other configurations are possible. In another embodiment, the single circuit is configured to apply a current and measure a voltage. In another embodiment, the first detector 308 and 408 comprises a plurality of circuits. In another embodiment, the first detector 308 and 408 is configured to detect the impedance differential between electrodes 306 and 406, respectively. In another embodiment, the first detector 308 and 408 is configured to determine both the impedance presented at each electrode 306 and 406, respectively, and the impedance differential between electrodes 306 and 406, respectively.

While a particular second detector 412 has been described, one of skill in the art will appreciate that other configurations are possible. In another embodiment, the single circuit is configured to apply a current and measure a voltage. In another embodiment, the second detector 412 comprises a plurality of circuits.

While particular electrodes have been described, one of skill in the art will appreciate that other configurations are possible including, but not limited to, concentric, coplanar, circular, elliptical, disc, etc., electrodes. Other suitable electrode configurations are described in U.S. Pat. No. 9,979,206 to Nyberg et al. filed on Sep. 4, 2015, the relevant portions of which are incorporated herein by reference.

While the receiver 510 has been described as comprising the rectifier 514, one of skill in the art will appreciate that other configurations are possible. In another embodiment, the receiver 510 does not comprise a rectifier. In this embodiment, the load 512 is electrically connected to the receive resonator 520.

Although embodiments have been described above and are shown in the accompanying drawings, one of skill in the art will appreciate that variations and modifications may be made without departing from the scope as defined by the appended claims, and the scope of the claims should be given the broadest interpretation consistent with the specification as a whole.

What is claimed is:

1. A transmit resonator comprising:
   at least two inductors;
   a switching network electrically connected to the inductors;
   a plurality of capacitive electrodes electrically connected to the switching network;
   a detector communicatively connected to a controller, the detector configured to detect impedance; and
   the controller communicatively connected to the switching network and the detector, the controller configured to control the switching network to control which electrodes are connected to the inductors based on the detected impedance, wherein the inductors and electrodes are configured to resonate to generate an electric field.

2. The transmit resonator of claim 1, wherein the detector comprises a first detector and a second detector.

3. The transmit resonator of claim 2, wherein the first detector is configured to detect impedance presented to the electrodes.

4. The transmit resonator of claim 2, wherein the second detector is configured to detect impedance during wireless power transfer.

5. The transmit resonator of claim 1, wherein the detector comprises at least one circuit and a phase detector.

6. The transmit resonator of claim 5, wherein the circuit is configured to measure impedance by applying a voltage and detecting a current.

7. The transmit resonator of claim 1, wherein the switching network is configured to electrically connect each electrode to both inductors.

8. The transmit resonator of claim 1, having an equal number of inductors as capacitive electrodes.

9. The transmit resonator of claim 1, wherein the capacitive electrodes are electrically connected to the switching network via the inductors.

10. The transmit resonator of claim 1, wherein the detector is electrically connected to the controller and/or the controller is electrically connected to the switching network.

11. The transmit resonator of claim 1, wherein the inductors are variable inductors.

12. The transmit resonator of claim 11, wherein the controller is electrically connected to the variable inductors, and wherein the controller is configured to control the inductance of the variable inductors.

13. The transmit resonator of claim 12, wherein the capacitive electrodes are electrically connected to the switching network via the variable inductors.

14. The transmit resonator of claim 1, wherein the inductors and electrodes are configured to resonate to generate the electric field to transfer power via electric field coupling.

15. A wireless power transfer system comprising the transmit resonator of claim 1.

16. A wireless power transfer system comprising:
a transmitter comprising:
  a power source configured to generate a power signal; and
  a transmit resonator electrically connected to the power source, the transmit resonator comprising:
    at least two transmit inductors;
    a switching network electrically connected to the transmit inductors;
    a plurality of transmit capacitive electrodes electrically connected to the switching network;
    a detector communicatively connected to a controller, the detector configured to detect impedance; and
    the controller communicatively connected to the switching network and the detector, the controller configured to control the switching network to control which transmit capacitive electrodes are connected to the transmit inductors based on the detected impedance, wherein the transmit inductors and transmit capacitive electrodes are configured to resonate to generate an electric field; and
a receiver comprising:
  a load; and
  a receiver resonator electrically connected to the load, the receive resonator comprising:
    at least two receive inductors; and
    at least two receive capacitive electrodes electrically connected to the receive inductors, wherein the receive inductors and receive capacitive electrodes are configured to resonate in the generated electric field and extract power via resonant electric field coupling.

17. The wireless power transfer system of claim 16, wherein the transmitter further comprises an inverter electrically connected between the power source and the transmit resonator.

18. The wireless power transfer system of claim 16, wherein the receiver further comprises a rectifier electrically between the load and the receive resonator.

19. A method of wireless power transfer, the method comprising:
detecting impedances at at least two capacitive electrodes electrically connected to a switching network;
communicating the impedances at the capacitive electrodes to a controller communicatively connected to the switching network;
determining, at the controller, a subset of capacitive electrodes to connect to at least two inductors based on the impedances at the capacitive electrodes, the inductors electrically connected to the switching network;
connecting the subset of capacitive electrodes to the inductors; and
resonating the inductors and the subset of capacitive electrodes to generate an electric field.

20. The method of claim 19, wherein connecting the subset of capacitive electrodes comprises sending a signal from the controller to the switching network to connect the subset of capacitive electrodes to the inductors.

21. The method of claim 19, further comprising:
detecting impedances at the inductors;
sending the impedances at the inductors to the controller;
determining, at the controller, if the impedances at the inductors are within a range of impedances; and
sending a signal from the controller to the switching network to disconnect all capacitive electrodes from the inductors if the impedances at the inductors are not within the range of impedances.

22. The method of claim 21, wherein the range of impedances are impedances at which power can be transferred from the capacitive electrodes and inductors via resonant electric coupling.

23. The method of claim 19, further comprising:
resonating inductors and capacitive electrodes of a receiver at a resonant frequency; and
extracting power from the generated electric field via resonant electric field coupling.

* * * * *